(12) United States Patent
Nucci

(10) Patent No.: US 7,584,507 B1
(45) Date of Patent: Sep. 1, 2009

(54) ARCHITECTURE, SYSTEMS AND METHODS TO DETECT EFFICIENTLY DOS AND DDOS ATTACKS FOR LARGE SCALE INTERNET

(75) Inventor: Antonio Nucci, Burlingame, CA (US)

(73) Assignee: Narus, Inc., Sunnyvale, CA (US)

( * ) Notice: Subject to any disclaimer, the term of this patent is extended or adjusted under 35 U.S.C. 154(b) by 768 days.

(21) Appl. No.: 11/193,115

(22) Filed: Jul. 29, 2005

(51) Int. Cl.
*G08B 23/00* (2006.01)
*G06F 15/18* (2006.01)

(52) U.S. Cl. .......................................... 726/23; 726/22
(58) Field of Classification Search .................. 726/23, 726/22
See application file for complete search history.

(56) References Cited

U.S. PATENT DOCUMENTS 7,284,272 B2 * 10/2007 Howard et al. ................. 726/22
2008/0267409 A1 * 10/2008 Raike .......................... 380/278

OTHER PUBLICATIONS

Noh et al., "Detecting Distributed Denial of Service (DDoS) Attacks through Inductive Learning", Mar. 21, 2003, Springer Berlin/Heidelberg, 289-290.*
Metwally et al., "Duplicate Detection in Click Streams", May 10, 2005, ACM New York, 17.*
Bilar et al., "Introduction to State-of-the-Art Intrusion Detection Technologies", 2001, Proc of SPIE, vol. 4232: 123, section 5.1.*
Wang, et al., "SYN-dog: Sniffing SYN Flooding Sources", Nov. 7, 2002, Distributed Computing Systems.*
Kim et. al, "A Nonparametric Multichart CUSUM Test for Rapid Detection of DOS Attacks in Computer Networks", Dec. 2004, International Journal for Computing and Information Sciences, vol. 2:3.*
Zheng et al., "A new method of data preprocessing and anomaly detection", Machine Learning and Cybernetics, 2004. Proceedings of 2004 International Conference. Aug. 26, 2004, vol. 5, 2685-2690.*

* cited by examiner

*Primary Examiner*—Lewis G. West
*Assistant Examiner*—Lisa Lewis
(74) *Attorney, Agent, or Firm*—Fernandez & Associates, LLP

(57) ABSTRACT

The present invention efficiently detects various DDoS attacks for large scale Internet with the temporal correlation of traffic flows on the two directions of a single link, the spatial correlation of DDoS attack traffic at different locations and powerful machine learning algorithms. With these techniques, the present invention effectively detects and identifies attack sources without modifying existing IP forwarding mechanisms and without a global upgrade to Internet backbone routers. More importantly, the present invention can detect synchronized DDoS attacks even if the volume of attack traffic is extremely small at the location that is close to the attack source.

16 Claims, 22 Drawing Sheets

| Algorithm 1 Bloom Filter operations |
| --- |
| Require: $s \in S$ |
| 1: procedure BloomFilterInsert ($V, s$) |
| 2:    for all $i \in Z_k$ do |
| 3:       $V[h_i(s)] \leftarrow 1$ |
| 4:    end for |
| 5: end procedure |
|   |
| 6: function BloomFilterSearch ($V, s$) |
| 7:    for all $i \in Z_k$ do |
| 8:       if $V[h_i(s)] \neq 1$ then |
| 9:          return false |
| 10:       end if |
| 11:    end for |
| 12:    return true |
| 13: end function |

FIG. 6

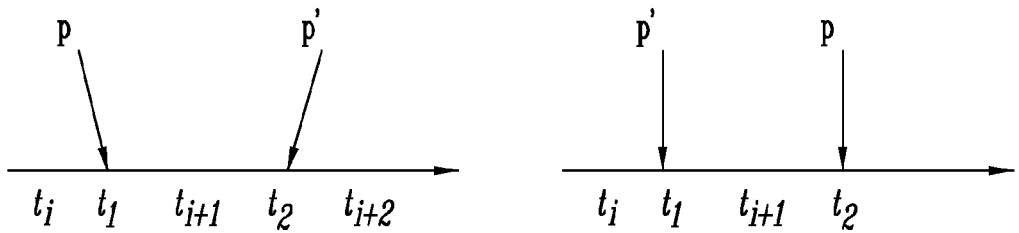
FIG. 7a                    FIG. 7b
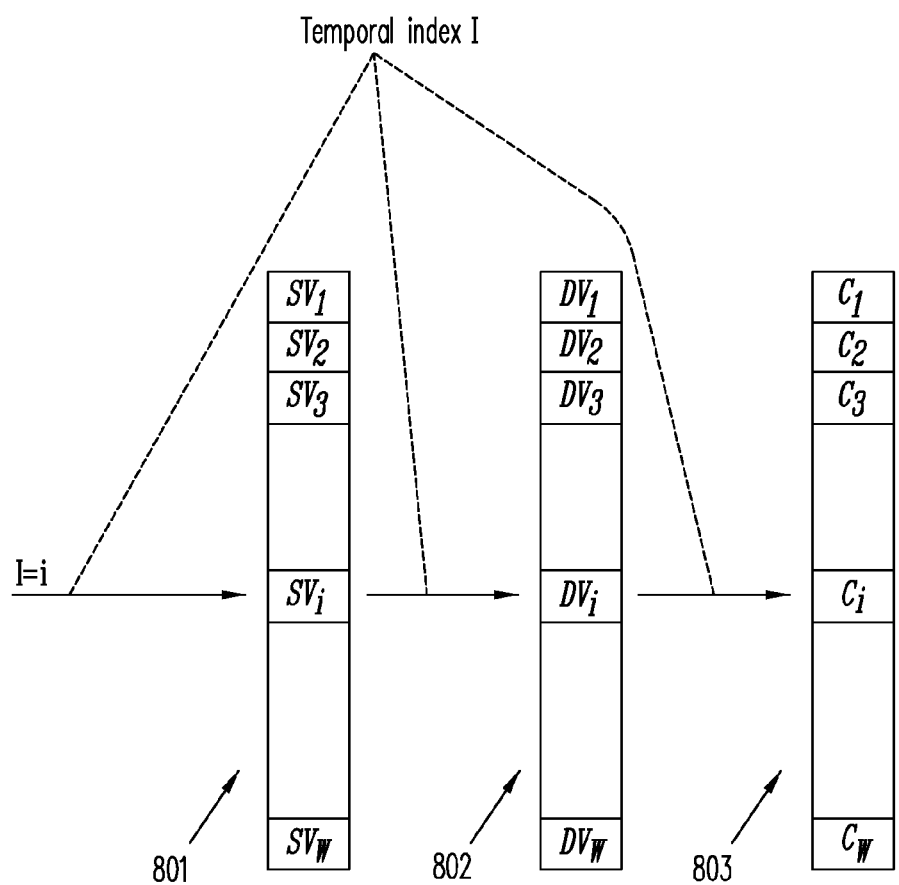
FIG. 8

Algorithm 2 Bloom Filter Array Algorithm

1: procedure PROCINBOUND ($p$)
2:    $a \leftarrow$ false, $b \leftarrow$ false
3:    if $\exists j, i - w + 1 \leq j \leq i$, such that BloomFilterSearch $(DV_j, f(p))$ returns true then
4:      $a \leftarrow$ true
5:    end if
6:    if BloomFilterSearch $(SV_i, f(p))$ returns true then
7:      $b \leftarrow$ true
8:    end if
9:    if $a$ and $b$ are both false then
10:      $C_i$ ++
11:    end if
12:    BloomFilterInsert $(SV_i, f(p'))$
13: end procedure 14: procedure PROCOUTBOUND ($p'$)
15:    for $j \leftarrow i$ to $i - w + 1$ do
16:      if BloomFilterSearch $(DV_j, f'(p'))$ returns true then
17:
18:
19:    end if
20:      if BloomFilterSearch $(SV_j, f'(p'))$ returns true then
21:        $C_j$ --
22:      end if
23:    end for
24:    BloomFilterInsert $(DV_i, f'(p'))$
25: end procedure 26: function SAMPLE ($i$)
27:    return $C_{i-w+1}$
28: end function

FIG. 9

Algorithm 3 Bloom Filter Array Algorithm using sliding window

1: procedure PROCINBOUND($p$)
2:    $a \leftarrow$ false, $b \leftarrow$ false
3:    if $\exists j, j \in \{(I-w+1)\%w, (I-w+2)\%w, ..., I\%w\}$, such that BloomFilterSearch($DV_j, f(p)$) returns true then
4:       $a \leftarrow$ true
5:    end if
6:    if BloomFilterSearch($SV_I, f(p)$) returns true then
7:       $b \leftarrow$ true
8:    end if
9:    if $a$ and $b$ are both false then
10:       $C_I$ ++
11:    end if
12:    BloomFilterInsert($SV_I, f(p)$)
13: end procedure 14: procedure PROCOUTBOUND($p'$)
15:    for $j \leftarrow I$ to $(I-w+1)\%w$ do
16:       if BloomFilterSearch $(DV_j, f'(p'))$ returns true then
17:
18:
19:       end if
20:       if BloomFilterInsert $(SV_j, f'(p'))$ returns true then
21:          $C_j$ --
22:       end if
23:    end for
24:    BloomFilterInsert $(DV_I, f'(p'))$
25: end procedure 26: function SAMPLE
27:    return $C_{(I-w+1)\%w}$
28: end function

FIG. 10

Inference Algorithm (1) $t = 0$; initialize irregular-tree structure $Z(0)$ to quad-tree;
(2) Belief Propagation: compute $\forall i \in V$, $\hat{x}_i(0) = \arg\max_{x_i \in C} P(x_i | Z(0), F, \Xi)$;
(3) repeat
    (4) Expectation-Maximization Algorithm
        repeat
            Expectation: $Q_t(\Omega, \Omega') = E[\log P(Z, \hat{X}(t), F | \Xi, \Omega) | \hat{X}(t), F, \Xi, \Omega]$
            Maximization: $\hat{\Omega}' = \max_{\Omega'} Q_t(\Omega, \Omega')$
            Assign: $\Omega \leftarrow \hat{\Omega}'$
        until convergence
(5) $t = t + 1$;
(6) Bayesian estimation of structure:
    Compute in bottom-up pass for $\ell = 0, 1, ..., L$
    $(\forall i \in V^\ell)(\hat{z}_i \neq 0) \hat{j} = \arg\max_{j \in \{0, V^{\ell+1}\}} P(z_{ij} = 1 | \xi_{ij})$;
(7) Belief Propagation: compute $\forall i \in V, x_i(t) = \arg\max\ x_i \in C\ P(x_i | Z(t), F, \Xi)$;
(8) $\hat{X} = X(t); \hat{Z} = Z(t)$;
(9) until $\left| \dfrac{P(F|\hat{X}) - P(F|X(t-1))}{P(F|X(t-1))} \right| < \varepsilon$ for $N$ consecutive iteration steps.

Belief Propagation for the Tree

| Preliminary downward pass: $\forall i \in V^{L-1}, V^{L-2}, ..., V^0$,
• $P(x_i) = \Sigma_{x_j} P(x_i | x_j) P x_j)$,
| Bottom-up pass:
■ Initialize leaf nodes: $\forall i \in V^0$,
    • $P(x_i | f_i) \propto P(x_i) P(f_i | x_i) P(x_i)$,
    • $P(x_i, x_j | f_i) = P(x_i | x_j) P(x_i) P(x_i | f_i) / P(x_i)$,
▲ compute upward $\forall i \in V^1, V^2 ..., V^L$, $\dfrac{P'(x_c | F_{d(c)}) P(x_c | (x_i)}{P(x_c)}$,
    • $P(x_i | F_d) \propto P(x_i) \Pi c \in c(i) \Sigma x_c$
    • $P(x_i, x_j | F_{d(i)}) = P(x_i | x_j) P(x_j) P(x_i | F_{d(i)}) / P(x_i)$,
| Top-down pass:
■ Initialize root: $\forall i \in V^L$,
    • $P(x_i | F) = P(x_i | F_{d(i)})$,
    • $\hat{x}_i = \arg\max_{x_i} P(x_i | F)$,
▼ compute downward $\forall i \in V^{L-1}, V^{L-2}, ..., V^0$,
    • $P(x_i | F) = \sum\limits_{x_j} \dfrac{P(x_i, x_j | F_{d(i)})}{\Sigma_{x_i} P(x_j, x_i | F_{d(i)})} P(x_j | F)$,
    • $\hat{x}_i = \arg\max_{x_i} P(x_i | F)$

FIG. 18

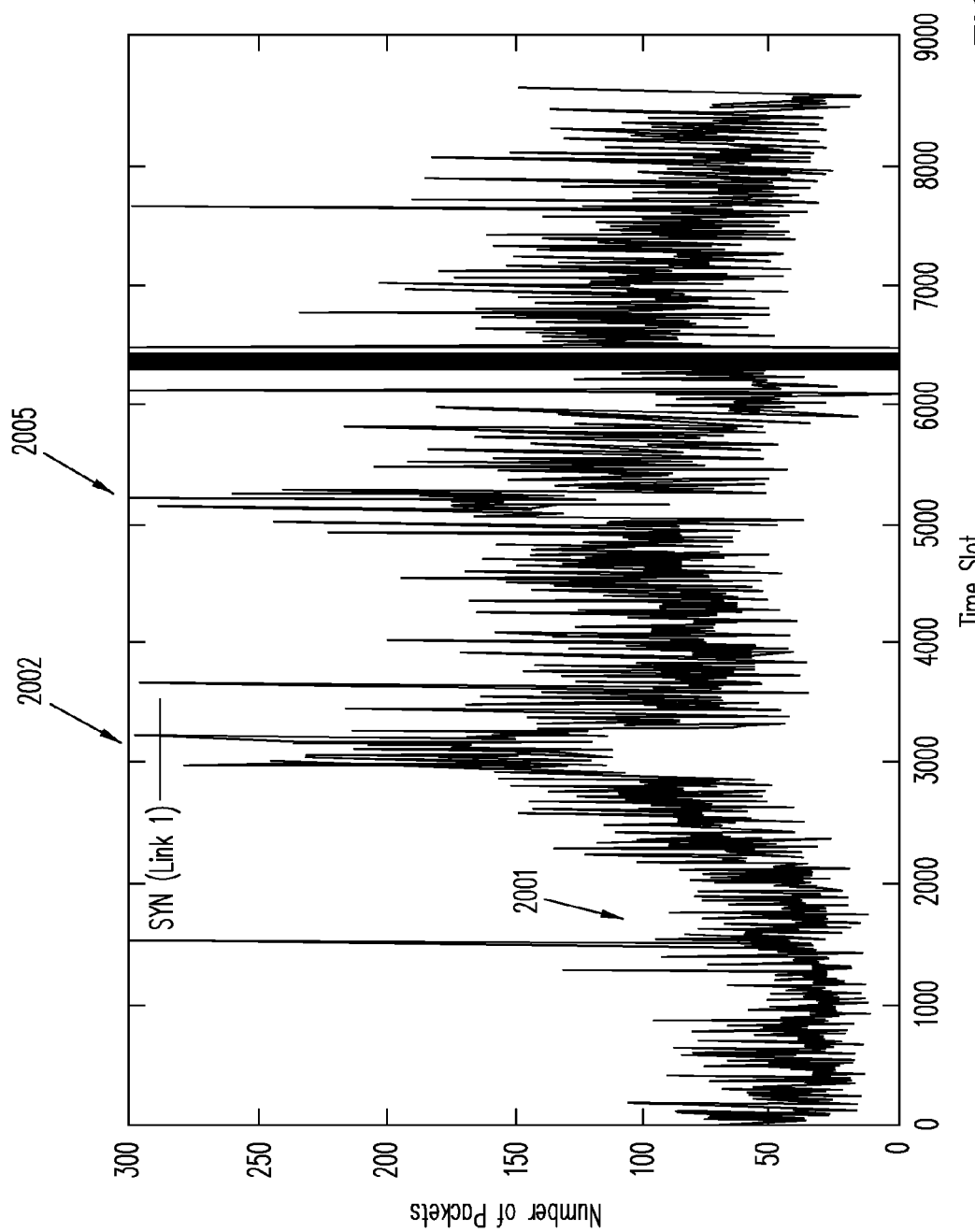

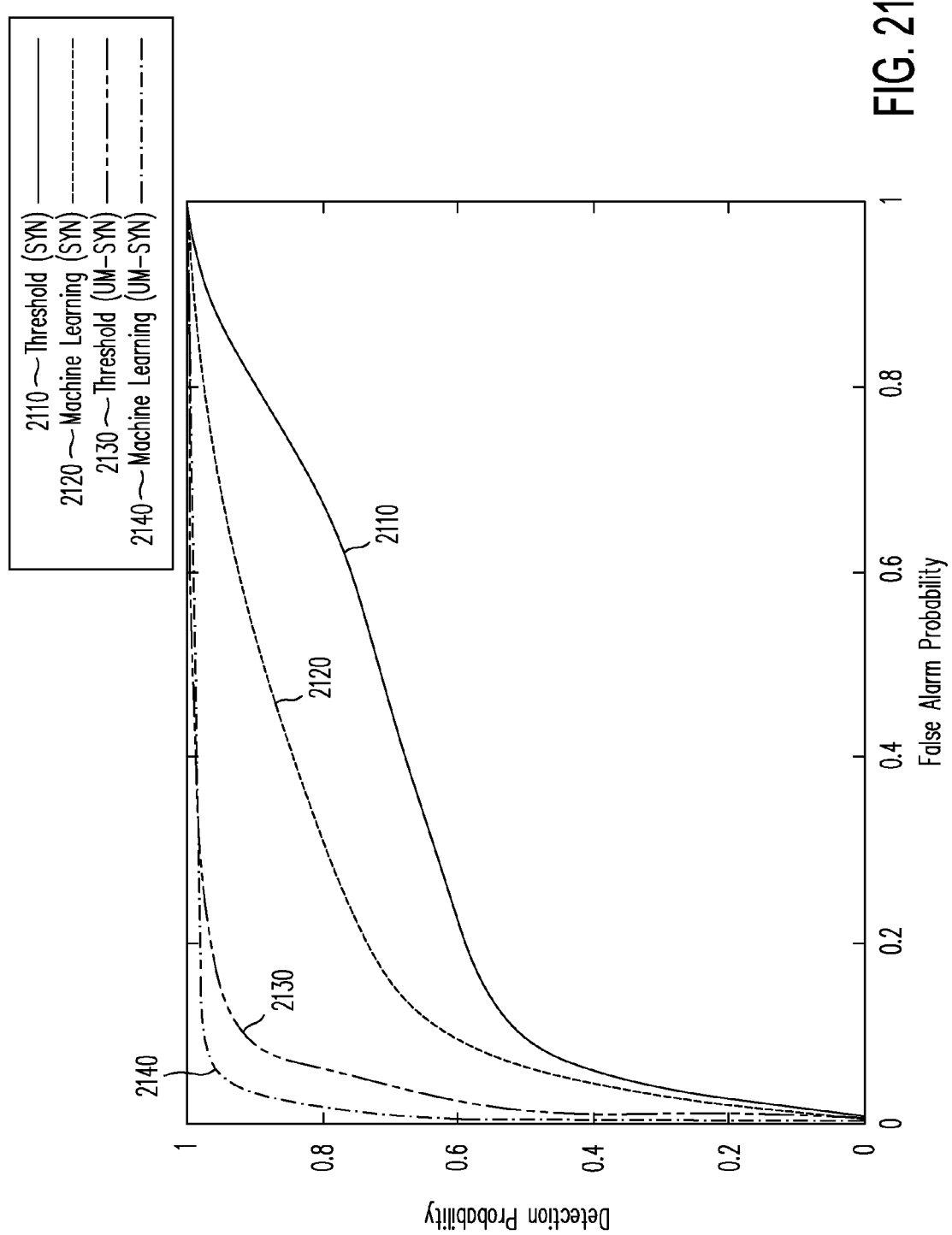

ARCHITECTURE, SYSTEMS AND METHODS TO DETECT EFFICIENTLY DOS AND DDOS ATTACKS FOR LARGE SCALE INTERNET

BACKGROUND

1. Field

The invention relates in general to Internet Security and, in particular to detection of denial of service (DoS) attacks and distributed denial of service (DDoS) attacks.

2. Related Art

In recent years, denial of service (DoS) attacks and distributed denial of service (DDoS) attack has become a major security threat to Internet service. A DoS attack and DDoS attack can completely consume the resources of a server, which will be unable to provide services for legitimate users. With the exponential increase of Internet-based e-business and e-commence, the damage of DoS attacks and DDoS attacks is becoming more and more significant. Therefore, how to handle DoS attacks and DDoS attacks and protect the access of legitimate users has become a crucial challenge and has attracted the attention f both the industry and academia.

Due to the readily available tools and its simple nature, flooding packets is the most common and effective DoS attack. While flooding tools have been becoming more sophisticated, they have been getting easier to use. An adversary without much knowledge of programming can download a flooding tool and then launch a DoS attack. The flooding traffic of a DoS attack may originate from either a single source or multiple sources. We call the latter case a distributed denial of service (DDoS) attack. Briefly, a DDoS attack works as follows. An attacker sends control packets to the previously-compromised flooding sources, instructing them to target at a given victim. The flooding sources then collectively generate and send an excessive number of flooding packets to the victim, but with fake and randomized source addresses, so that the victim cannot locate the flooding sources. To foil DoS attacks, researchers have designed and implemented a number of countermeasures. In general, the countermeasures of DoS attacks can be classified into three different categories: detection, defense (or mitigation), and IP trace-back mechanisms. Detecting DoS attacks in real time is the first step of combating DoS attacks. An automated and fast detection is essential to the protection against DoS attacks. Upon timely detection of a DoS attack, more sophisticated defense mechanisms will be triggered to shield victim servers or link bandwidth from DoS traffic, and block the prorogation of DDoS traffic at routers. At the same time, we can perform more expensive IP trace-back to single out flooding sources. Unlike defense and trace-back mechanisms, detection itself should be an always-on function with little overhead, causing minimal disruption to normal operations and withstanding any flooding attacks. Basically, detecting DoS attacks belongs to network-based intrusion detection. A network-based intrusion detection system (NIDS) is based on the idea that an intruder's behavior will be noticeably different from that of a legitimate user and that many unauthorized actions are detectable. A commonly used detection approach is either signature-based or anomaly-based. A signature-based NIDS inspects the passing traffic and searches for matches against already-known malicious patterns. A key advantage of signature-based detection algorithms is their high degree of accuracy in detecting known attacks and their variations. Their obvious drawback is the inability to detect attacks whose instances have not yet been observed. Anomaly detection approaches, on the other hand, build models of normal data and detect deviations from the normal model in observed data. Anomaly detection have the advantage that they can detect new types of attacks as deviations from normal usage. However, anomaly detection schemes suffer from a high rate of false alarms. This occurs primarily because previously unseen (yet legitimate) system behaviors are also recognized as anomalies, and hence flagged as potential attacks.

In the literature, there are a number of anti-DoS/DDoS systems, which can be generally categorized into host-based systems and network-based systems. Examples can be found in Mirkovic et. al. "A taconomy of DDoS attack and DDoS defense mechanism," ACM SIGCOMM Computer Communications Review, vol. 34, no. 2, p. 39, 2004 and Chen et. al. "Characterization of defense mechanisms against distributed denial of service attacks," 2003, submitted to Computers and Security. In host-based anti-DoS/DDoS systems, services can be protected by using firewall and intrusion detection system (IDS), and/or by applying carefully designed the service system, for example, a service system that includes a server farm and a load balancer. Although this approach can clearly protect the server system, it may not be efficient to protect legitimate users because the attack traffic has utilize a huge amount of resources in the network and because it is very difficult for the host to distinguish attack traffic from legitimate traffic in many circumstance.

With network-based anti-DoS/DDoS systems, on the other hand, the DoS/DDoS traffic can be filtered before it reaches the edge router that connects the potential victim. In this manner, the network-based anti-DoS/DDoS system is more efficient. Nevertheless, a network-based system is more difficult to be implemented since it may require the coordination of a huge number of elements in the Internet service provider (ISP) network, such as core routers, edge routers, and network management systems. In the present invention, we focus on the network-based anti-DoS/DDoS system for the ISP networks.

From the network perspective, an anti-DoS/DDoS system includes two major components: the detection system and the defense system. The detection system is responsible to report the occurrence of an ongoing DoS/DDoS attacks and to identify the attack sources. Apparently, to detect the attacks, a system can be implemented at the edge router that connects to the victim network. Similar to the host-based anti-DoS/DDoS systems, this detection system can be built on firewall and IDS systems. However, such an approach has the same drawback as that of the host-based systems. Clearly, it is more desirable to detect DoS/DDoS attacks at locations that are closer to the attack source. In the literature, Savage et. al. "Practical network support for ip traceback," Proc. of ACM SIGCOMM'2000, August 2000. discusses the most common approach to identify the attack sources is IP traceback, in which the route of an incoming IP packet and/or the address of the edge router that forwarded this packet to the core network can be stored in IP packets. Unfortunately, such kinds of schemes require a global deployment and the modification of existing IP forwarding mechanism, for example, modifying the IP header, which is a difficult task, if not impossible.

The defense system is responsible to react to the attacks. Typically, depending on the information that can be provided by the detection system, defense can be classified into packet filtering and rate limiting. Examples can be found in Chen et. al. "Perimeter-based defense against high bandwidth DDoS attacks," IEEE Transaction on Parallel Distributed Systems 2005. If the identification system can provide exact signature of attack traffic, then all packets that belong to the attack traffic will be directly blocked. On the other hand, if the identification system can only provide limited information, then the defense system can only limit the rate of potential attack traffic, which means that a portion of attack traffic will still be able to reach the victim and that some legitimate traffic will be mistakenly filtered.

From the discussion above, we can observe that the efficiency of the whole anti-DoS/DDoS system is highly dependent on the performance of the detection system. However, many existing schemes may require the modification of existing packet forwarding mechanism, such as IP traceback. More importantly, we observe that existing schemes ignore the characteristics of DDoS attacks, namely, the spatial and temporal correlation of the attack traffic.

Moreover anomaly detection algorithms need to be adaptive, which means they must be able to cope with constantly changing network conditions. Therefore, sophisticated traffic analysis is required to manage the strong non-stationary behavior of normal Internet traffic and at the same time distinguish between natural variations in traffic profiles, such as changed usage patterns between day and night, week-days and weekend or a flash-crowd to a web-site, and truly anomalous traffic variations, such as DDoS attacks. Second, the algorithms need to show a good trade-off between false positive/negative ratio and detection lag (time interval between the time at which the attack starts and the time at which the anomaly is detected). Third, the algorithms need to be computationally simple because of the multi-Gigabit per second (Gbps) links used by most of the carriers today and limited memory usage for on-fly information storage. Forth, the algorithms should detect both low and high-volume attacks. Most of the anomaly detection algorithms proposed usually handles the high-volume attack but their performance degrades severely as soon as the attacks rate drops below a specific threshold becoming almost undistinguishable with "Internet noise". To gain a thorough picture of the overall traffic in a network, it is important for an adaptive anomaly detection solution to see the complete traffic profiles. Therefore, to handle the typical large, distributed networks of carriers and service providers, anomaly detection solutions need to be deployable such that a large number of links must be monitored in a cost-effective, yet scalable manner. Moreover, in order to detect low-volume attacks, the algorithm must extract and correlate a few key features that represent sufficiently well normal traffic behavior such to guarantee a fast and efficient detection of anomalies in their infancy stage.

In the literature, Wang et. al. "Detecting SYN flooding attacks," Proc. IEEE INFOCOM'2002 New York City N.Y., June 2002, pp. 1530-1539 proposed to detect TCP SYN flood by using the ratio of the number of TCP SYN packets and the number of TCP FIN and RST packets. Ideally, if there are no SYN flood attacks, this ratio will be close to 1 in a sufficiently long duration, since most TCP sessions begin with a SYN packet and end with a FIN packet. However, one of the main difficulties of this scheme is that the duration of TCP sessions can be very large, which means that the ratio may not be close to 1 in a long period. To overcome this problem, Wang et. al. "Change point monitoring for the detection of dos attacks," IEEE Transactions on Dependable and Secure Computing, no. 4 pp. 193-208, October 2004 proposed to use the ratio of the number of SYN packets and the number of SYN/ACK packets on the other direction, since the appearance of SYN and the corresponding SYN/ACK packets is the round trip time of the connection, which has much less variation. Nevertheless, this scheme can only be deployed at the location that is close to the attacker and can only detect SYN attack with spoofed source IP address.

It is well known that most of the DDoS attacks are characterized by using spoofed source IP addresses. Moreover, the number of packets from the same spoofed source IP addresses is relatively small, compared to the number of packets of a real session. Consequently, to generate a certain amount of attacks, the number of IP addresses will be large. Based on this assumption, Peng et. al. proposed to use the ratio of new IP address to detect attacks with spoofed source addresses in "Protection from distributed denial of services attacks using history based IP filtering," Proc. IEEE ICC 2003, Anchorage, Ak. May 2003, pp. 482-486 and "Detecting distributed denial of services attacks using source IP address monitoring," Department of Computer Science and Software Engineering, The University of Melbourne, Tech. Rep., 2002: http://www.cs.mu.oz.au/~tpeng. In this scheme, a database is required to store the information of all IP addresses that appeared in a certain period, which means that the memory requirement is very large for large-scale Internet.

In addition to monitor the feature data such as the ratio of the number of TCP SYN packets and the number of TCP FIN and RST packets or the ratio of the number of SYN packets and the number of SYN/ACK packets on the other direction, another important issue is how to detect attacks or anomalies based on the observed feature data. In the literature, a number of existing studies suggested to use the statistical method, in particular, the change-point algorithm in Wang et. al. "Detecting SYN flooding attacks," Proc. IEEE INFOCOM'2002 New York City N.Y., June 2002, pp. 1530-1539, Peng et. al. "Detecting distributed denial of services attacks using source IP address monitoring," Department of Computer Science and Software Engineering, The University of Melbourne, Tech. Rep., 2002: http://www.cs.mu.oz.au/~tpeng and Blazek et. al. "A novel approach to detection of "denial-of-service" attacks via adaptive sequential and batch-sequential change-point detection methods," Proc. IEEE Workshop on Information Assurance and Security, West Point, N.Y., June 2001, pp. 220-226. The key idea behind the change-point algorithm is based on the observation that an attack leads to relatively abrupt changes in statistical models of traffic compared to the "normal mode". These changes occur at unknown points in time and should be detected "as soon as possible". Therefore, the problem of detecting an attack can be formulated and solved as a change-point detection problem: detect a change with a fixed delay (batch approach) or minimal average delay (sequential approach) with a minimum ratio of false alarm. However, we notice that in all these studies the parameters of the change-point algorithms are fixed and no comprehensive performance studies are provided. Moreover, these studies only consider one change, i.e. from normal to abnormal state. In practice, this approach may lead to significant false alarms after the finish of attacks.

Therefore, there is a need for a Robust and Efficient Detection scheme of DDoS Attacks for large-scale Internet.

SUMMARY

In the present invention, we devise a novel framework to detect and identify DDoS attacks. The key aspect of the present invention is to identify the attack sources by exploiting the spatial and temporal correlation of DDoS attack traffic. With this technique, our method can efficiently identify attack sources without modifying existing IP forwarding mechanism and without the global upgrade of existing systems.

Simulation results show that, the present invention can detect synchronized DDoS attacks even if the volume of attack traffic is extremely small at the location that is close to the attack source, which has never been achieved before.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 6 illustrates the insertion and search operations of Bloom filter.

FIG. 7a illustrates a boundary problem of Bloom filter that will increase the false alarm rate.

FIG. 7b illustrates an outbound-inbound problem of the Bloom filter that also increases the false alarm rate.

FIG. 8 illustrates the data structure of Bloom filter array.

FIG. 9 illustrates the algorithm of Bloom filter array.

FIG. 10 illustrates Algorithm 3, denoted as "BFA using sliding window" which represents an improved version of Algorithm-2 in FIG. 9.

FIG. 18 illustrates the inference algorithm and belief propagation algorithm of the machine learning algorithm.

FIG. 20b shows number of unmatched SYN packets of link2.

FIG. 21 is a set of ROC curves comparing the performance of threshold based algorithm and machine learning algorithm using two different feature data.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
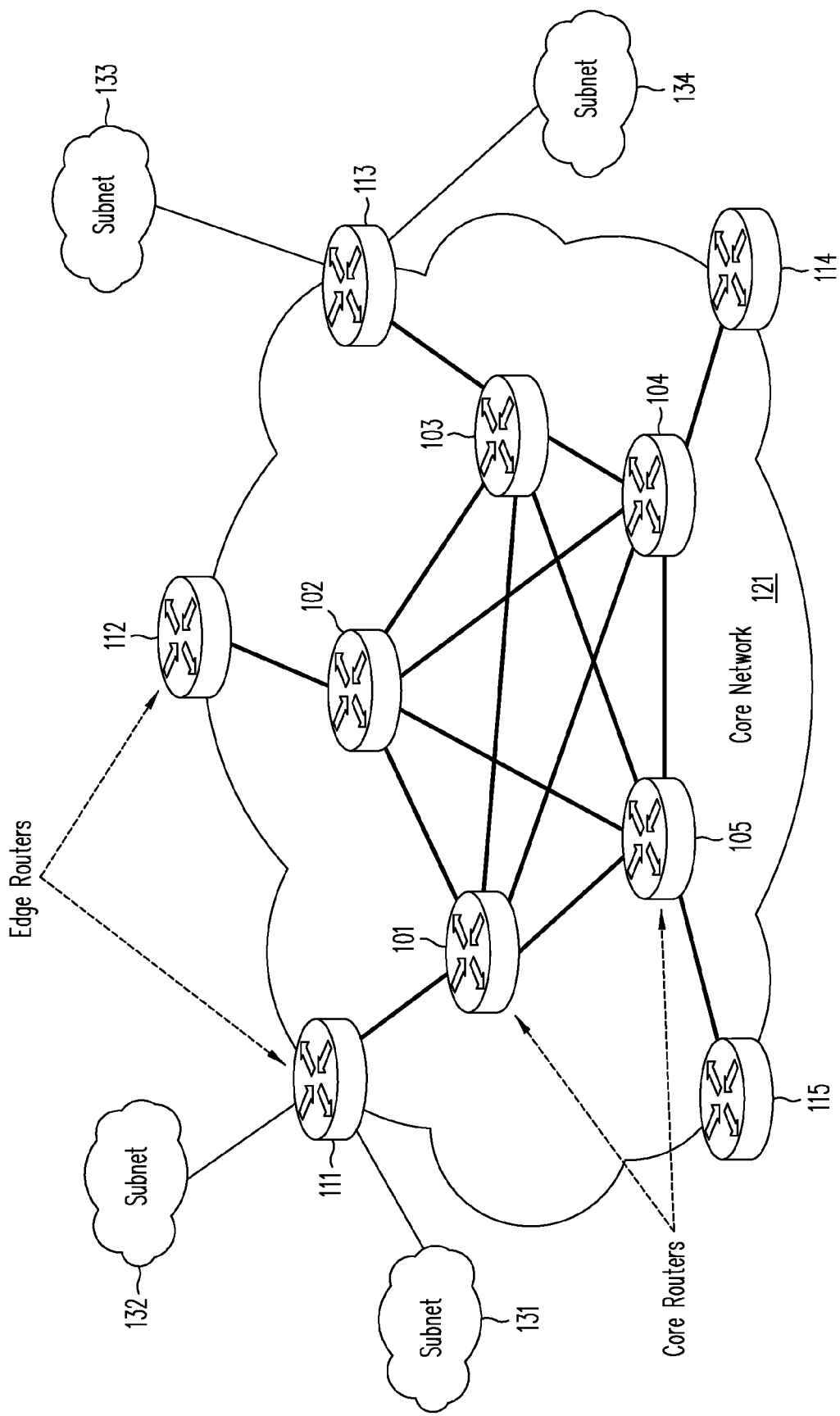
FIG. 1 is a schematic diagram illustrating a general structure of an ISP network wherein the system and method of the present invention may advantageously be utilized.

FIG. 1 is a schematic diagram illustrating a general structure of an ISP network wherein the system and method of the present invention may advantageously be utilized. The ISP network in FIG. 1 is composed of two types of IP routers: core routers 101-105 and edge routers 111-115. The core routers interconnect with one another to form a core network 121, which is responsible for exchange a huge amount of data in high data rates. By contrast, edge routers are responsible for connecting subnets 131-134 with the core network 121 and the data rate is relatively low.

Figure 2A:
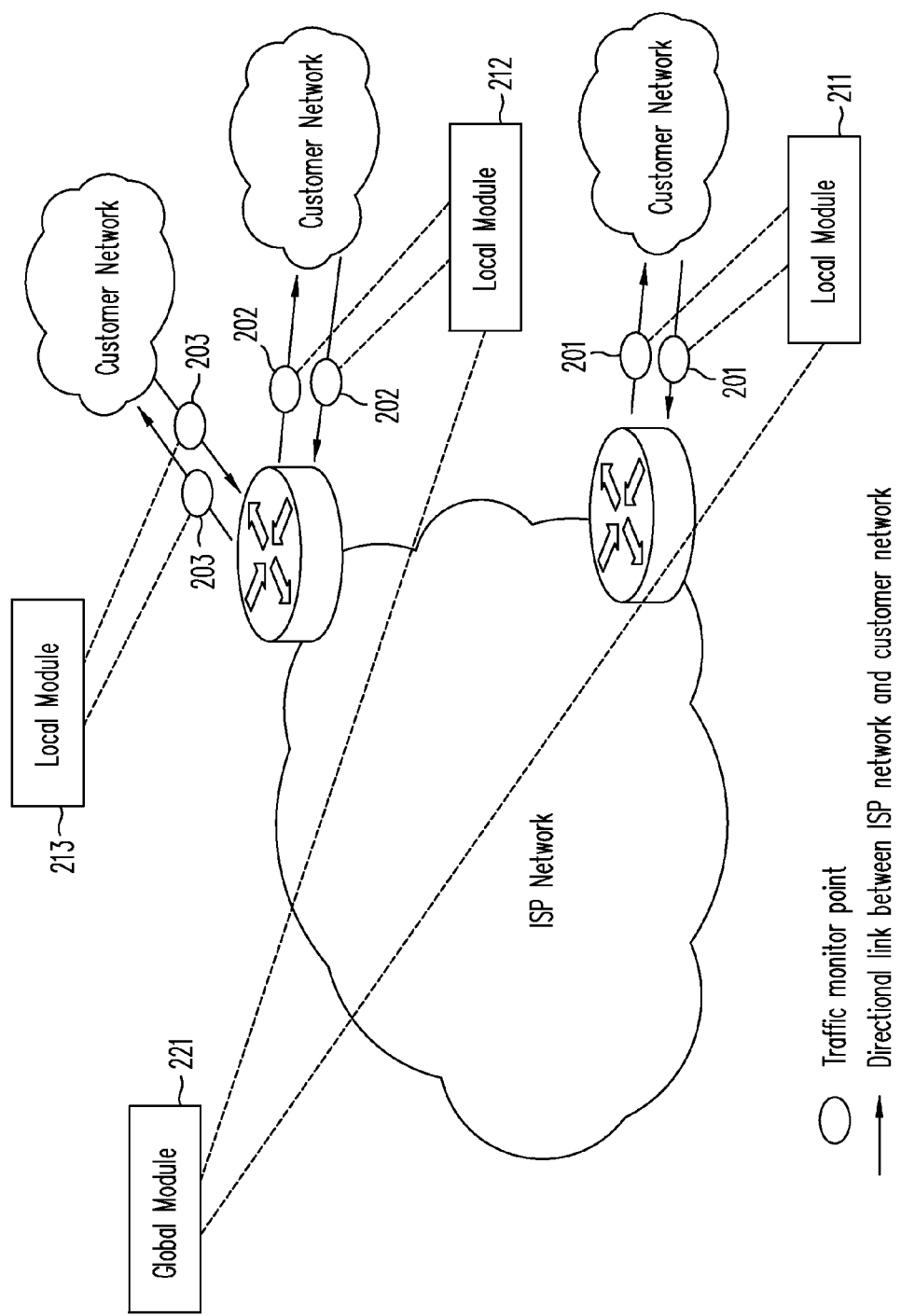
FIG. 2a is a schematic diagram of the system model in accordance with an embodiment of the present invention.

FIG. 2 is a schematic diagram of the system model in accordance with an embodiment of the present invention. In FIG. 2 there are three types of modules in the system. The traffic monitors 201-203 are responsible for scanning incoming packets in real-time, summarizing traffic characteristics, and generating simple feature information. The summary of traffic information and simple feature data will be reported to the local modules 211-213. The local module is responsible for generating more complicated feature data and for detecting attacks with local information. The detection results and feature data will be forwarded to the global module 221. The global module is responsible for analyzing feature data from multiple local modules and detecting abnormal situations through the machine learning algorithms, which will take into account the spatial and temporal correlation of traffic.

Figure 2B:
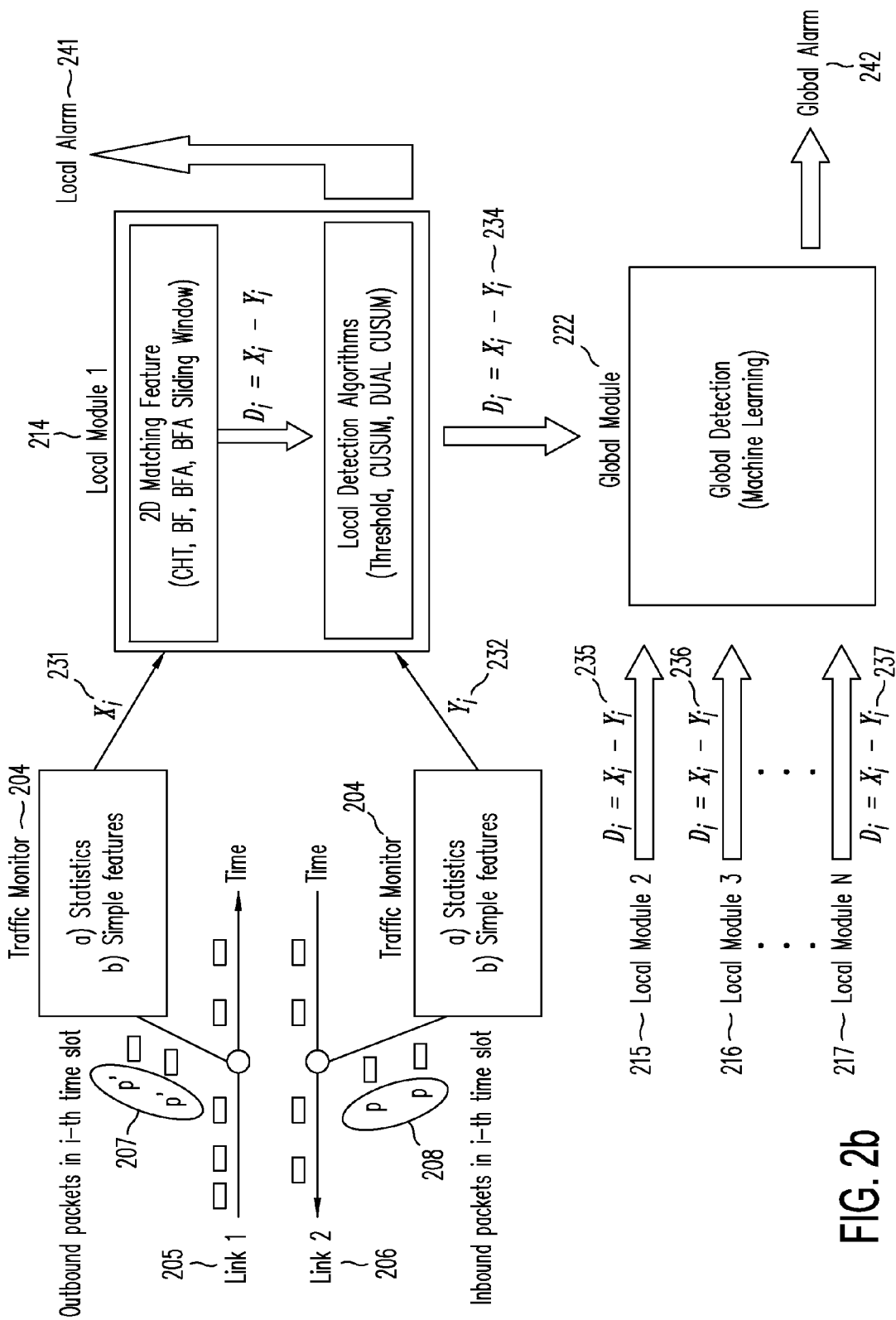
FIG. 2b is a schematic diagram illustrating the operation of an embodiment of the present invention.

FIG. 2b is a schematic diagram illustrating the operation of an embodiment of the present invention. Outbound packets 207 flowing across link 1 205 are monitored by traffic monitor 204 which derives statistics and simple feature 231. Inbound packets 208 flowing across link 2 206 are monitored by traffic monitor 204 which derives statistics and simple feature 231. Statistics and simple features 231 and 232 are forwarded to local module 214 which derives 2D features 234. 2D features 235-237 are derived by local modules 215-217. Global module 222 receives 2D features 234-237. Local module 214 produces local alarm 241 upon detecting DoS or DDoS attacks. Global module 242 produces global alarm 242 upon detecting DoS or DDoS attacks.

Figure 3:
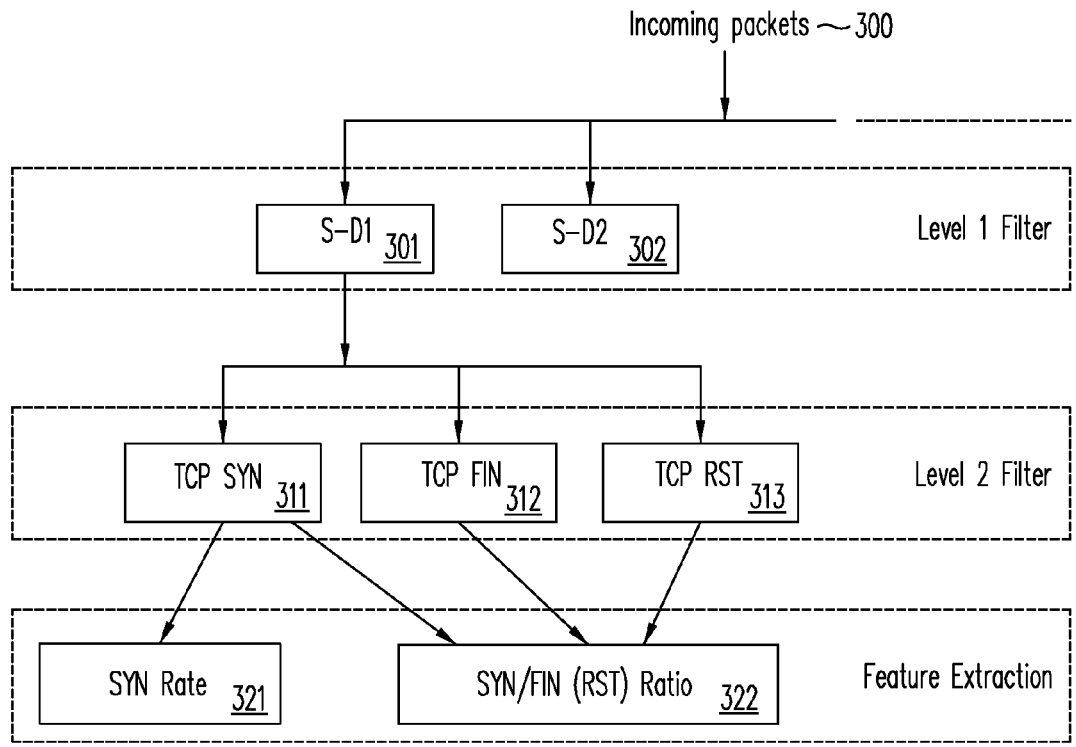
FIG. 3 is a schematic diagram of the feature extraction architecture in accordance with an embodiment of the present invention.

FIG. 3 a schematic diagram of the feature extraction architecture in accordance with an embodiment of the present invention. In FIG. 3, there are three types of components: level-one filter 301-302, level-two filter 311-313, and feature extraction module 321-322. While the first two types of components are implemented in the traffic monitor, the feature extraction modules can be implemented in both the traffic monitor and the local module, depending on what the feature is. In FIG. 3, the level-one filters 301-302 classify incoming packets 300 based on the source-destination pair. A source-destination pair S-D1 or S-D2 is defined according to source IP, source network mask, destination IP, destination network mask. For example, packets from 172.10.5.28 to 210.33.68.102 with network mask 255.255.255.255, and packets from 172.10.x.x to 208.33.1.x with network mask 255.255.0.0 and 255.255.255.0, are classified differently respectively. With this scheme, the administrator of the ISP network can configure the detection system of the present invention to investigate traffic for different customers at the same time. For example, if a specific customer request to detect abnormal traffic toward its server, the detection system can be configured such that only the packets with a specific destination will be investigated. Meanwhile, another customer can request to detect traffic toward a whole subnet. For packets with the same source-destination pair, the level-two filter further classifies packets into types. For example, TCP SYN filter 311, TCP FIN filter 312 and TCP RST filter 313. The filtered packets will then be forwarded to the feature extraction modules 321 and 322. For example, in FIG. 3, the number of TCP SYN packets can be used to generate both the TCP SYN rate feature at 321 and the TCP SYN/FIN(RST) ratio feature at 322. On the other hand, we also note that a certain feature may need the information from multiple level-two filters. For example, the SYN/FIN(RST) ratio feature at 322 requires the information from three filters 311-313, as illustrated in FIG. 3. Although FIG. 3 shows only 3 examples of level-two filter 311-313, level-two filters can classify packets according to types including (but not limited at): 1) SYN, 2) SYN Non-Fragmented, 3) SYN HTTP, 4) FIN SSH, 5) FIN, 6) FIN Non-Fragmented, 7) FIN HTTP, 8) FIN SSH, 9) RST, 10) SYN/ACK, 11) SYN/URG, 12) SYN/URG HTTP, 13) SYN/URG SSH, 14) Total Number of Packets, 15) Total Number of Fragmented Packets, 16) ACK, 17) HTTP, 18) SSH, for TCP, and 1) Total Number of Packets, 2) Total number of Fragmented Packets, 3) DNS, 4) SNMP for UDP, 1) Total Number of Packets, 2) Total number of Fragmented Packets for ICMP, and 1) Total Number of Fragmented Packets for IP. The present invention is more general and efficient compared to the packet classification schemes in Wang et. al. "Detecting SYN flooding attacks," Proc. IEEE INFO-COM'2002 New York City N.Y., June 2002, pp. 1530-1539 and Peng et. al. "Detecting distributed denial of services attacks using source IP address monitoring," Department of Computer Science and Software Engineering, The University of Melbourne, Tech. Rep., 2002: http://www.cs.mu.oz.au/~tpeng.

As mentioned earlier, some features are generated within the traffic monitor. These features are generally simple and can be extracted by using the traffic information of a single uni-directional link. The feature extraction module will report a value (or a vector) at the end of each time slot where the duration of the time slot is defined as Ts, which may vary for different features. Intuitively, a shorter Ts may reduce the detection delay, which is defined as the duration from the time the attack starts to the time that the attack is detected. On the other hand, a smaller Ts may also increase the computational complexity, since the detection algorithm need to analyze the feature data time slot by time slot. Moreover, the Ts must be sufficient large if the feature is represented by ratio. For example, if we want to use the SYN/FIN(RST) ratio detect SYN flood, then the Ts cannot be too small, because the number of FIN packets in a short period can be 0, which will result in false alarm even if the number of SYN packets is not large.

In one embodiment of the present invention, the traffic monitor can generate the following features: (1) Packet rate: the number of packet arrivals in this time slot. This feature is simple but useful to detect high volume DoS and DDoS attacks. It can hardly detect low volume attacks. (2) Data rate: the total number of bits of all packets arrived in this time slot. (3) SYN/FIN(RST) ratio: the ratio of the number of SYN packets arrived in this time slot and the number of FIN (and a portion of RST) packets arrived in this time slot. Detail discussion on how to get the ratio can be found in Wang et. al. "Change point monitoring for the detection of dos attacks," IEEE Transactions on Dependable and Secure Computing, no. 4 pp. 193-208, October 2004.

Although the traffic monitor can generate simple features efficiently, these features may not be sufficient to detect various attacks. In particular, the packet rate and data rate features may only be useful for high volume attacks; while the performance of SYN/FIN(RST) ratio depends on the duration of TCP sessions, which has a large variation. To improve the performance of detection algorithm, one embodiment of the present invention uses the local module to generate more sophisticated features, for example, the SYN/SYN-ACK ratio proposed in Wang et. al. "Change point monitoring for the detection of dos attacks," IEEE Transactions on Dependable and Secure Computing, no. 4 pp. 193-208, October 2004 and the new IP ratio proposed in Peng et. al. "Detecting distributed denial of services attacks using source IP address monitoring," Department of Computer Science and Software Engineering, The University of Melbourne, Tech. Rep., 2002: http://www.cs.mu.oz.au/~tpeng. (1) SYN/SYN-ACK ratio: the ratio of the number of SYN packets arrived in one direction of a bi-directional link and the number of SYN-ACK packets arrived in the opposite direction of the bi-directional link in one time slot. This scheme can only be deployed at the location that is close to the attacker and can only detect SYN attack with spoofed source IP address. (2) New IP ratio: the number of new IP addresses appeared in this time slot versus the total number of IP addresses appeared in this time slot. The feature can only be used to detect attacks with spoofed address and requires a huge history IP address database.

Figure 4A:
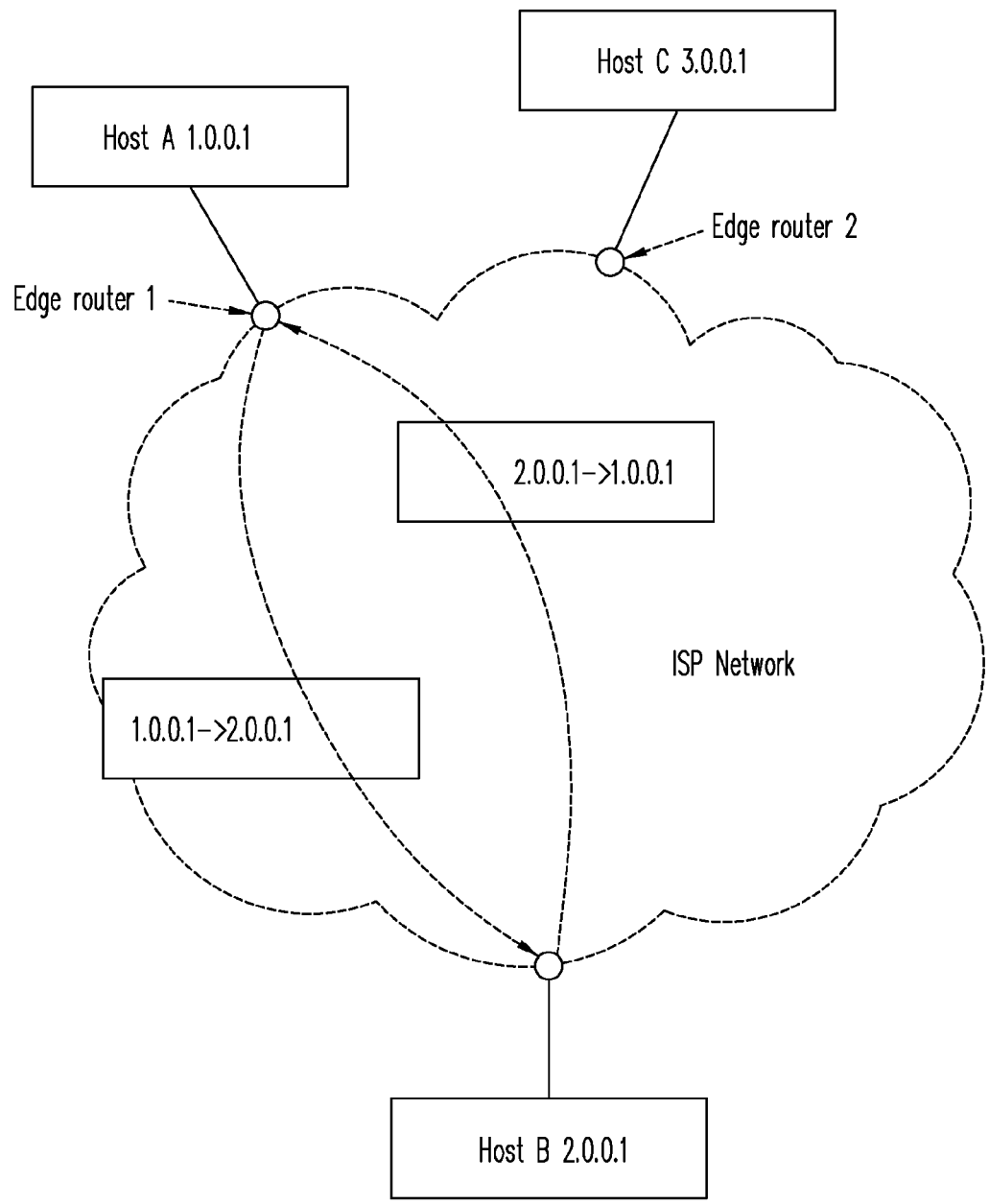
FIGS. 4a and 4b illustrate an ISP network with edge router wherein the system and method of the present invention may advantageously be utilized.
Figure 4B:
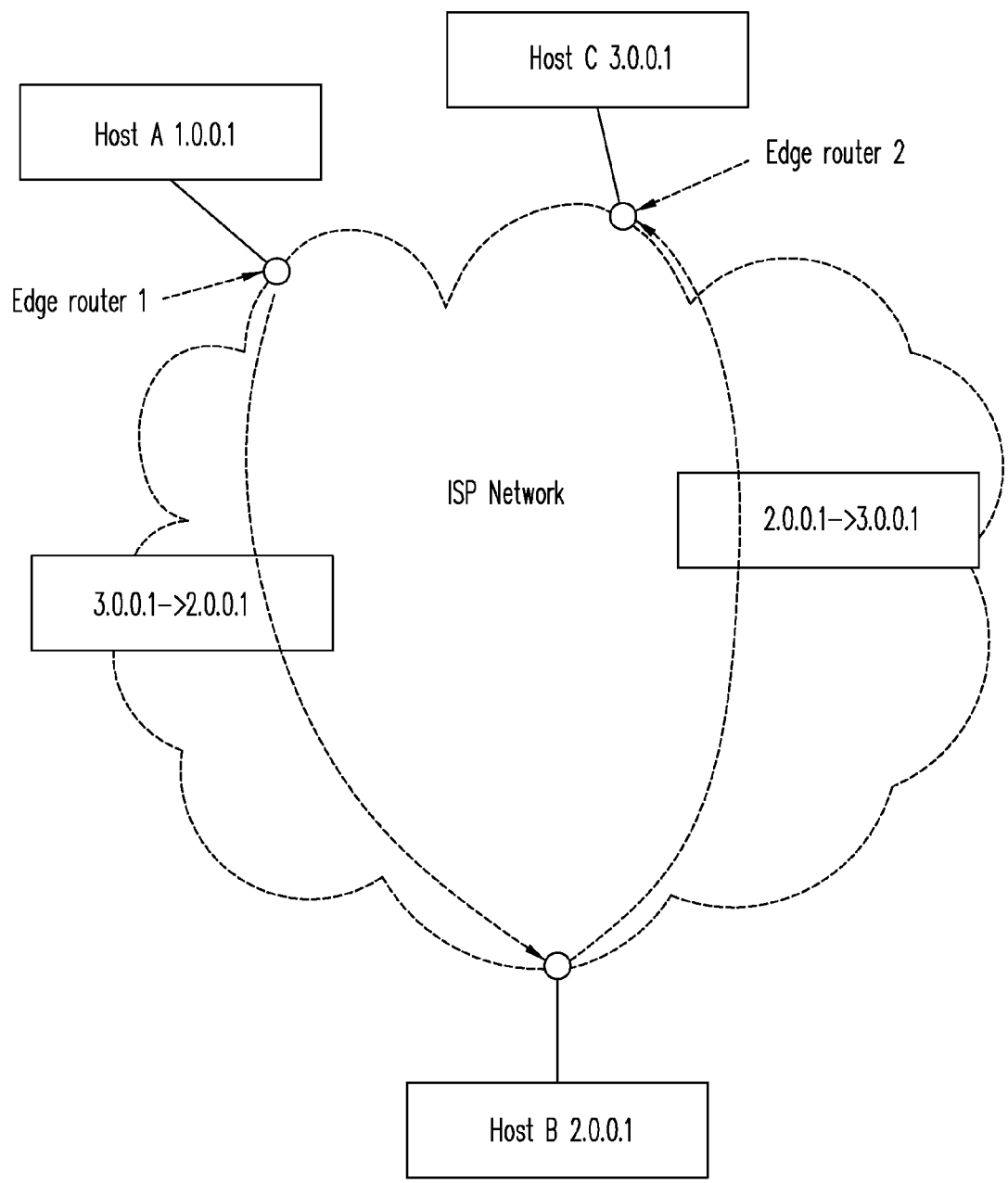

Since the local module can have the traffic information on both directions of a link, one embodiment of the present invention uses a general and more efficient feature extraction module to take into consideration the temporal correlation of traffic information on both directions of the link. The reason is as the following. For most IP applications, packets are generated from both ends. Therefore, the information carried by packets on one direction shall match with the information carried by packets on the other direction. For example, if station A communicates with station B through TCP, then we can observe packets with source A and destination B on one direction, and we can also observe packet with source B and destination A on the opposite direction as illustrated in FIG. 4a. On the other hand, if a DDoS attack generate source A on one direction, the response may not appear if the source IP address is spoofed as illustrated in FIG. 4b. Therefore, this feature can be utilized to detect a set of DDoS attacks.

In the present invention, a key is defined as the information that shall appear on both direction of a link. For instance, the key for TCP SYN packet is defined as <srcIP, dstIP, srcPort, dstPort, Seq\#>. A corresponding key for SYN-ACK packet on the opposite direction is defined as <dstIP, srcIP, dstPort, srcPort, Ack\#−1>. By examining whether a key has matched correspondence on the other direction, the SYN flood or SYN-ACK flood attacks can be detected. Since these features are generated by matching the key information on two directions of a link, they are called 2D matching features. Symmetric traffic on a link means that packets from host A to B and packets from B to A can be observed on the opposite directions of a link. In practice, this condition is generally valid for the edge links. It is important to note that, even if the traffic is not symmetric on a link, the key matching can still be conducted if the network topology and routing are known. The present invention utilizes one or more of the 16 keys listed as follows:

1) Matching Source IP of inbound packet to Destination IP of outbound traffic

2) Matching SYN of inbound packet to SYN/ACK of outbound packet

3) Matching SYN (HTTP) of inbound packet to SYN/ACK of outbound packet

4) Matching SYN (SSH) of inbound packet to SYN/ACK of outbound packet

5) Matching SYN/URG of inbound packet to SYN/ACK of outbound packet

6) Matching SYN/URG (HTTP) of inbound packet to SYN/ACK of outbound packet

7) Matching SYN/URG (SSH) of inbound packet to SYN/ACK of outbound packet

8) Matching SYN/ACK of inbound packet to ACK of outbound packet

9) Matching SYN/ACK of inbound packet to SYN of outbound packet

10) Matching FIN of inbound packet to FIN of outbound packet

11) Matching FIN(HTTP) of inbound packet to FIN of outbound packet

12) Matching FIN(SSH) of inbound packet to FIN of outbound packet

13) Matching ICMP of inbound packet to ICMP of outbound packet

14) Matching UDP of inbound packet to UDP of outbound packet

15) Matching UDP (DNS) of inbound packet to UDP of outbound packet

16) Matching UDP (SNMP) of inbound packet to UDP of outbound packet

One embodiment of the present invention uses hash table to store the statistical traffic information recorded by the traffic monitors on the two directions of a link in each time slot to implement the 2D matching features. The procedure in traffic monitor is as the following. For each packet that passed through the level-two filter, a certain hash function will be called to locate the record. If the record is empty, then the key will be stored and a counter will be set to one; if the record is not empty and the key of the packet and the key of the record are identical, then the counter will be added by one; if the record is not empty and the keys are different, then a collision occurs. The collision can be either resolved by some avoidance techniques such as linear probing and rehashing, or can be simply ignored which means that the key information of the incoming packet will not be saved. At the end of each time slot, the traffic monitor will send all non-empty records to the local module. The performance of this implementation is measured by three major factors: (1) Memory requirement: Let the total umber of records in the hash table be $N_{ht}$ and let the length of each record be $L_k$ bytes, then the total memory requirement is $N_{ht}*L_k$. Here $L_k$ is depending on the length of the key. For example, for the key for SYN packets, we need 16 bytes to store the key and 4 bytes to store the status information and the counter. Therefore, $L_k$=20 bytes. (2) Processing speed: The main time complexity is due to the hash function and key comparing, both of which can be implemented efficiently either through software or hardware. (3) Communication requirement: If the local module and the traffic monitor are not in the same device, then the record information will be transmitted from the traffic monitor to the local module at the end of each slot. In the worse scenario, the data rate requirement is $8*N_{ht}*L_k/Ts$ bit per second.

The main feature data of the 2D matching feature are the number of unmatched keys and the ratio of unmatched keys. Note that other feature data, including the packet rate, can also be collected. To check whether a key is matched or not, the present invention considers the temporal correlation of packets. For example, a SYN packet must followed by a SYN-ACK packet with the same key. Consequently, if we want to determine whether a SYN is matched, we need to investigate the coming SYN-ACK in the later slots. On the contrary, we need to scan SYN in previous slots to check if a SYN-ACK packet is valid.

To efficiently perform 2D matching, four alternative embodiments of the present invention are proposed: conventional hash table, Bloom filter, Bloom filter array and Bloom filter array with sliding window.

To formally define the above matching mechanisms we introduce the notation listed as follows.

The present invention uses the following notations:

| | |
|---|---|
| $\Gamma$ | A constant defining the time slot duration |
| $t_i$ | A series of time points, $t_i = t_{i-1} + \Gamma$ |
| p | An inbound IP packet |
| $P_i$ | The set of packets p during the i-th time slot $[t_i, t_{i+1})$ |
| p' | An outbound IP packet |
| $P_i'$ | The set of packets p' during he i-th time slot $[t_i, t_{i+1})$ |
| f(p) | Feature extracted from p |
| f'(p') | Feature extracted from p' |
| $X_i$ | $\{f(p)|p \text{ in } P_i\}$ |
| $Y_i$ | $\{f'(p')|p' \text{ in } P_i'\}$ |
| $D_i$ | $X_i - Y_i$ for time slot $[t_i, t_{i+1})$ |

Here f(p) and f'(p') represent the key extracted from the packet p and p' that shall match under normal network condition according to the 2D-matching feature. Then p and p' are matched packets and f(p)=f'(p').

Here $D_i=X_i-Y_i$ means that the feature extracted is sampled at the end of each time slot. To tolerate the propagation time of network, $\Gamma$ is chosen to be larger than the maximum Round Trip Time (RTT), the time between the arrival of a packet p at the edge router and the arrival of its matched packet p' at the same edge router.

Accordingly if for the key considered, during the i-th time slot $[t_i, t_{i+1})$, there is no DDoS attack entering ISP network through the edge router, then for most packet p, there will be a packet p' such that f(p)=f'(p'). That results in a small $|D_i|$, where || represents the operator cardinality of a set. On the other hand, if, during the i-th time slot $[t_i, t_{i+1})$, there is a DDoS attack entering ISP network through the edge router, $|D_i|$ will be very large. Accordingly one embodiment of the present invention uses $|D_i|$ as a good measurement to detect DDoS attack.

Compared with conventional one-way feature detection mechanisms, the 2D-matching feature detection mechanism used by the present invention has obvious advantages:

1. Since network protocols which generate two-way traffic dominate in the Internet, the mechanism finds its feasibility;

2. It exploits more information of traffic than one-way feature detection mechanism, which guarantees better performance;

3. The mechanism works on edge routers, which provides more prompt detection than mechanisms running at the victim side.

One embodiment of the present invention uses Conventional hash table to retrieve $|D_i|$. More detail information regarding Conventional hash table can be found in Burton H. Bloom, "Space/Time Trade-offs in Hash Coding with Allowable Errors", Communication ACM, volume 13, no. 7, July, 1970, pp. 422-426 which is incorporated herein by reference. The procedure in this embodiment of the present invention to retrieve $|D_i|$ is as follows:

1. A buffer is organized into a hash table with 1 cells of (b+1) bits each where the feature used is b bits long. The extra bit is the state bit, either 0 meaning "UNMATCHED" or 1 meaning "MATCHED".
2. When a packet p comes, if there is no entry for f(p) in buffer, create one entry for f(p) and set the state of that entry to "UNMATCHED"; When a packet p' comes, if there is an entry for f'(p') in buffer, set the state of that entry to "MATCHED";
3. At time $t_{i+1}$, assign the number of entries with state "UNMATCHED" to $|D_i|$.

In this procedure three operations are required: Insertion, Search and Removal where setting the state to "MATCHED" is the removal operation.

The Insertion Operation is as follows:

1. Generate a pseudorandom number k by applying a hash function on f(p), where $0 \leq k \leq l-1$.
2. If the k-th cell is empty, insert f(p) into the cell and set the state to "UNMATCHED".
3. If the k-th cell is NOT empty, generate a new pseudorandom number k and repeat from steps 2.
4. The process ENDS when a cell EMPTY is found.

The Search Operation is similar to the insertion operation. A sequence of pseudorandom numbers are generated using the same generation technique as above until one of the following occurs.

1. A cell storing the feature is found.
2. An empty cell is found which means there is no such feature stored in buffer.

If a nonempty cell is found during the search operation, the Removal Operation is just to set the state of the cell to "MATCHED"

Figure 5:
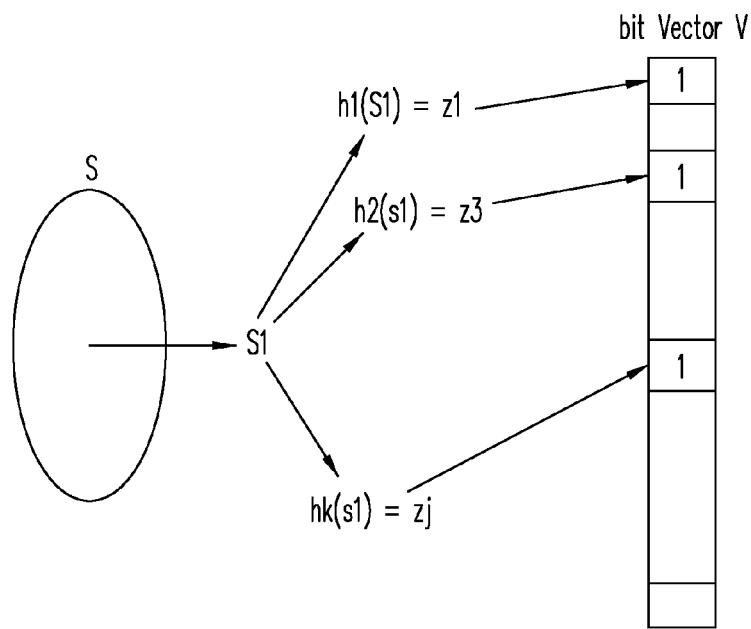
FIG. 5 is a schematic diagram of the Bloom filter data structure.

An alternative embodiment of the present invention uses Bloom filter array to retrieve $|D_i|$. The conventional hash table (CHT) is able to provide good results for an offline network trace analysis. However, to be applied to multi-gigabit edge routers and process high throughput traffic, an algorithm is needed with better space/time trade-off, where space refers to the memory required to store information and time refers to the CPU cycles required to run it. The Bloom filter has shown in the past high space/time performance achieved. More detail information regarding Bloom filter can be found in Burton H. Bloom, "Space/Time Trade-offs in Hash Coding with Allowable Errors", Communication ACM, volume 13, no. 7, July, 1970, pp. 422-426 which is incorporated herein by reference. Bloom filter is a simple space-efficient randomized data structure for mapping a larger set S into a smaller set Z as illustrated in FIG. 5. The space efficiency is achieved at the cost of a small probability of false positive, but often this is a conventional trade-off for real-time high-volume applications. A Bloom filter uses a bit-vector V of length m (m-bits), and k independent hash functions $h_i: S \rightarrow Z_m$, where Z represents the set of natural numbers, $i \in Z_k$, S is the set of data of interest, i.e. f(p), and $Z_m = \{0, 1, \ldots m-1\}$. At the beginning, all cells of the vector V are assigned to zero. Each coming packet p is hashed k times by using the k hash functions. Each hash function points to a specific cell, or location, of the vector V. Hence, for each packet p k-cells are pointed and all bits $h_i(f(p))$ for all $1 \leq i \leq k$ are set to "MATCHED". A location can be set to "MATCHED" multiple times, but only the first change has an effect. To check if a feature f(p) is in S, it is checked whether all $h_i(f(p))$ are set to "MATCHED". If not, then clearly p is not a member of S. If all $h_i(f(p))$ are set to "MATCHED", then p is in S with some error probability. Hence a Bloom filter may yield to false positive, where it suggests an element p is in S even though it is not. For the application of the present invention, false positive is acceptable as long as their probability is sufficient small.

FIG. 6 illustrates the insertion and search operations of Bloom filter. Although Bloom filter has better space/time trade-off than CHT, it cannot be directly applied to application of the present invention because of the following problems:

1. Bloom filter does not provide removal operation. Since one bit in the vector may be mapped to more than one item in S, it is unsuitable to remove the item just by setting all bits indexed by its hash functions to "UNMATCHED";
2. Bloom filter uses one buffer to store features of inbound packets during the i-th time slot. This may cause boundary problem, as shown in FIG. 7a. A packet p arrives at time $t_1$ and its matched packet p' arrives at time $t_2$. Since f(p) is counted in $X_{i+1}$ (time slot $(t_i, t_{i+1})$) whereas f'(p') is not counted in $Y_{i+1}$ (time slot $(t_i, t_{i+1})$), the packet p will be counted as an unmatched inbound packet even though $t_2 - t_1 < \Gamma$. Therefore, boundary problem will increase the false alarm rate.
3. FIG. 7b illustrates the scenario that a packet p' may arrive before its matched packet p. When a packet p' arrives at time $t_1$, f(p') is not in the buffer, so the algorithm do not do anything. At time $t_2$, its matched packet, p, arrives and f(p) will be stored into buffer. When $|D_2|$ is sampled at time $t_2$, the packet p is regarded as an unmatched inbound packet. This outbound-inbound problem also increases the false alarm rate.

The main idea of the Bloom filter array (BFA) used in this embodiment of the present inventions is illustrated as follows to address the above problems of a basic Bloom filter:

1. Insertion and removal operation is replaced by increasing and decreasing a counter. An item does not need to be actually removed from buffer.
2. A larger time slot is fragmented in multiple tiny time slots to reduce the boundary problem.
3. Both features of inbound and outbound packets are kept to eliminate the inbound-outbound problem. When an inbound packet p arrives and its features match previous outbound packet p' already there, packet p is not included in the calculation of $|D_i|$ because considered as fully matched.

FIG. 8 illustrates the data structure of BFA is as follows:

1. A smaller time slot, i.e. the previous time slot of duration $\Gamma$ is further divided into w time slots of duration $\tau$ ($\Gamma = w \times \tau$: $\rightarrow t_{i+1} = t_i + \tau$).
2. An array of bit vectors SV 801 to store the features of inbound packets over time. Each entry is denoted by $SV_i$, where the index $i \in Z_w$ represents the i-th time slot $[t_i, t_{i+1})$.

3. An array of bit vectors DV 802 to store features of outbound packets over time. Each entry is denoted by $DV_i$, where the index $i \in Z_w$ represents the i-th time slot $[t_i, t_{i+1})$.

4. An array of integers C 803 to count the unmatched features over time. Each entry $C_i$, with $i \in Z_w$ is a counter for the i-th time slot $[t_i, t_{i+1})$ 5. An integer I representing the current time slot.

The history of SV, DV and C is not stored in memory since the features is checked for matching time-period by time-period, where $\Gamma$ denotes a time period. During the i-th time slot, only $\{SV_{i-w+1}, SV_{i-w+2}, \ldots, SV_i\}$, $\{DV_{i-w+1}, DV_{i-w+2}, \ldots, DV_i\}$ and $\{C_{i-w+1}, C_{i-w+2}, \ldots, C_i\}$ are kept in memory.

This embodiment of the present invention uses three functions for BFA: ProcInbound, ProcOutbound and Sample. The ProcInbound function is illustrated in FIG. 9 as follows. In the case when an inbound packet p comes within the i-th time slot $[t_i, t_{i+1})$. The i-th counter, i.e. $C_i$, is increased by 1 if none of the following conditions are satisfied:

1. f(p) is contained in at least one previous destination buffer $DV_j$, where $i-w+1 \leq j \leq i$ (condition 1);

2. f(p) is contained in the current source vector $SV_i$ (condition 2).

Condition 1 being true means that at least one matched packet of p was observed and p is not counted as a packet of an unmatched flow. Condition 2 being true means that inbound packets of the same flow as p have been observed within the current time slot and p is not double counted for this time slot. The two parameters a and b are two flags with initial value false. Flag a is used to indicate condition 1 (line 3 to 5) and flag b for condition 2 (line 6 to 8). If they are both false, $C_i$ is increased by one to indicate a new unmatched flow (line 9 and 11). In the end of ProcInbound, f(p) is inserted into the current vector SV (line 12).

The ProcOutbound function is illustrated in FIG. 7 as follows. When an outbound packet p' comes within time slot $[t_i, t_{i+1})$ $\forall j, i-w+1 \leq j \leq i$ the j-th counter $C_j$ is decreased by one if both of the following conditions are satisfied:

1. f(p') is not contained in $DV_j$ (condition 1);

2. f(p') is contained in S (condition 2).

Condition 1 being true means that no outbound packet of the same flow as packet p' came during the j-th period. Condition 2 being true means that there is an inbound packet p, which is a matched packet of the outbound packet p', coming during the j-th period. Meeting both conditions means that p has already been inserted but not yet removed. The removal operation is performed by decreasing $C_j$ by one. In FIG. 7, Line 15 starts a loop to iterate the time index j from i to i−w+1 (time period $\Gamma$ under consideration). Condition 1 is checked by lines 16 to 18 and condition 2 is checked by lines 19 to 21. The loop (line 17) is stopped if $DV_j$ contains f'(p'), because an outbound packet of the same flow came in the j-th time slot and all the previous buffers have already been checked. At the end of ProcOutbound, f'(p') is inserted into the current DV buffer (line 23).

The Sample function to estimate $|D_i|$ is illustrated in FIG. 7 as follows. It is straightforward that $|D_i|$ is equivalent to $C_i$. However, the time delay of sampling $|D_i|$ at the end of the i-th time slot (i.e. at time $t_{i+1}$) results in $|D_{i-w+1}|$ and not $|D_i|$. Therefore, there is a time delay $(w-1)\tau$. This embodiment of the present invention uses a sliding-window approach to overcome this problem.

The algorithm in FIG. 9 uses a poor memory allocation strategy. At time $t_{i+1}$ the algorithm samples $D_{i-w+1}$, frees the (i−w+1)-th buffer, and creates a new buffer for the (i+1)-th time slot. The sequence of these three operations is very inefficient for most operating systems. Since the memory released has the same size as the new memory allocated, this embodiment of the present invention assigns the unused buffer for the next time slot and avoid the delete/create operation this way. This is the idea of round-robin sliding window. This embodiment of the present invention allocates a memory area with fixed size for w SV vectors (i.e. $SV_i$, $i \in Z_w$), w DV vectors (i.e. $DV_i$, $i \in Z_w$) and w counters (i.e. $C_i$, $i \in Z_w$). The SV vector, DV vector, and C vector for the i-th time slot are now $SV_{i\%w}$, $DV_{i\%w}$, $C_{i\%w}$ respectively, where a % b represents the b-modulo operation on a. An index I is defined to indicate the current time slot. Rather than deleting an old buffer and allocate a new one, a new time slot is transited to by simply assigning I=(I+1)% w. Algorithm-3 in FIG. 10, denoted as "BFA using sliding window", represents an improved version of Algorithm-2 in FIG. 7. Basically, Algorithm-3 introduces two modifications into Algorithm-2 related to conditions for starting and ending the inner loop (line 3 and 15). This is because the index I points to the current time slot and the first time slot is thus (I−w+1)% w. At line 27, $C_{(I-w+1)}$ is returned because $C_{(I-w+1)\%w}$ is the counter for the first time slot in the window.

K hash functions are used in prior applications. In practice, however, it is not trivial to design proper hash functions for the two problems as follows. First, although a lot of research has been done on hash functions, it is not easy to evaluate all of them and select k suitable ones for the intended application of the present invention. Furthermore, k is a design parameter and depends on the network environment and specific needs of each ISP. It is hard to know how many hash functions are actually required to meet the above goals. Second, fixing the k hash functions might be very restrictive and dangerous. One principle of information security is that algorithm designers should not assume that their algorithms will not be exposed. Similarly, the hash functions used in BFA are preferably always secret. Indeed, what could be the effect if hash functions are exposed to third party that could use them to overcome the security barrier? If an attacker knows the hash functions, he can generate many attack packets $p_m$ such that for $\forall m, n, m \neq n, f(p_m) \neq f(p_n)$ but $h_i(f(p_m)) = h_i(f(p_n))$, $i \in Z_K$. The result is that even if there are many packets carrying different information, the BFA algorithm will consider them as belonging to the same flow thus violating the statistical foundation of the approach proposed in the present invention. In this case, the BFA would be unable to detect the above attacks. The present invention addresses the two problems above by simply using only one hash function and k keys randomly generated. More precisely each i-th hash function $h_i(x)$ is deployed as simply $h(KEY_i, x)$ where h is a predefined hash function and $KEY_i$ are random generated keys. For example, in one embodiment of the present invention, MD5 Digest Algorithm is used as the predefined hash function h. More details regarding the MD5 Digest Algorithm can be found in R. Rivest, "The MD5 Message-Digest Algorithm", RFC 1321, "http://www.faqs.org/rfcs/rfc1321.html", April, 1992 and is incorporated herein by reference. Since MD5 takes any number of bits as input, $KEY_i$ and x can be organized into one bit vector and apply MD5 on it. Since only one hash function is required and as many random keys as necessary can be used, the first problem is addressed straightforwardly. The second problem is solved by changing the keys periodically. Even if an attacker knows the selected hash function h, it is too difficult for him to keep track of current keys.

Space/time trade-offs of CHT and Bloom filter were analyzed in Burton H. Bloom, "Space/Time Trade-offs in Hash Coding with Allowable Errors", Communication ACM, volume 13, no. 7, July, 1970, pp. 422-426. However, this analysis is not valid with respect to the application of the present invention for the following reasons:

1. Bloom assumed a static data set such that content of buffer will not be changed. Its derivation of space/time trade-off was based on that assumption. The application of the present invention, however, deals with a dynamic data set because new features will be added into buffer over time. So their results are invalid for the application of the present invention. Moreover, as a consequence of the fact that Bloom used static-data-set, they only considered the search operation while the application of the present invention requires three operations, insertion, search, and removal.
2. Bloom defined the time complexity as the expected number of bit comparisons. That is unsuitable. In practice, a computer with L-bit processor (e.g. 32 bit CPU), one word comparison corresponds to L bits comparisons;

Bloom did not consider the number of hash function calculations. A typical word comparison operation consists of a "lw" instruction, which consumes 5 clock cycles, followed by a "bne" instruction, which consumes 3 clock cycles. More details can be found in David A. Patterson and John L. Hennessy, "Computer Organization and Design: The Hardware/Software Interface", Morgan Kaufmann, San Francisco, Calif., 1998, chapters 5, 6 which is incorporated herein by reference. Since CPU uses pipeline architecture, the total clock cycles of the two instructions is less than 8 clock cycles. On the other hand, a typical hardware implementation of MD5 consumes 64 clock cycles, not to mention the time for loading calculation result from dedicated hardware to memory. More details can be found in MD5 CRYPTO CORE FAMILY, HDL Design House, December, 2002 which is incorporated herein by reference. Obviously, the time spent on calculating hash functions dominates the whole processing time.

Accordingly the trade-off for these algorithms can be compared as follows.

| | |
|---|---|
| N | The random variable representing the number of items in the buffer |
| φ | The empty ratio |
| p | The probability that an item is falsely identified to be in the buffer |
| $N_m(t)$ | The maximum number of flows during the time period t |

$M_h$ denotes the size of hash table in bits and $T_h$ denotes the random variable representing the number of hash function calculations for CHT. These are used as metrics for the space/time performance.

For search operation, upon a packet p comes f(p) is checked in the hash table. Because an unsuccessful search will continue the loop until an empty cell is found, it consumes more time than a successful one does. So only time consumed for unsuccessful search is considered. The hash table has l-cells of (b+1) bits each, such that $M_h=l(b+1)$. In case there are n different flows captured the empty ratio, defined as the number of empty cell divided by the number of total cells of the vector, is:

$$\phi = \frac{l-n}{l} = \frac{M_h - n(b+1)}{M_h} \quad (1)$$

In each loop, CHT algorithm calculates one hash function and checks the addressed entry. If the entry is not empty, next loop is executed as it is assumed to be an unsuccessful search. The conditional probability that the loop is executed for x times for a given n is $$Pr[T_h = x | N = n] = \phi(1-\phi)^{x-1} \quad (2)$$

Therefore the conditional expectation of $T_h$ is $$E[T_h | N = n] = \sum_{x=1}^{\infty} x\phi(1-\phi)^{x-1} = \frac{1}{\phi} = \frac{M_h}{M_h - n(b+1)} \quad (3)$$

Since the time slot for CHT is Γ, the maximum number of flows in the buffer is $N_m(\Gamma)$. The expectation of $T_h$ is $$E[T_h] = \sum_{n=0}^{N_m(\Gamma)} Pr[N = n] E[T_h | N = n] \quad (4)$$

N has a uniform distribution such that $$Pr[N = n] = \frac{1}{N_m(\Gamma) + 1} \quad (5)$$

Combining equation (4) and (5), we get the expectation of $T_h$ equal to $$E[T_h] = \frac{1}{N_m(\Gamma) + 1} \sum_{n=0}^{N_m(\Gamma)} \frac{M_h}{M_h - n(b+1)} \quad (6)$$

Since the time to insert f(p) into or remove f(p) from a given entry is much shorter than the time required to find the proper entry, the time complexity of insertion and removal operations is equal to the time required by a search operation. Equation (6) gives the relationship between space and time for CHT.

To analyze the space/time trade-off of Bloom filter, $M_b$ denotes the length of bit vector used by Bloom filter and $T_b$ denotes the random variable representing the number of hash function calculations for Bloom filter. In case of Bloom filter, φ means the ratio of bits with value 0. k hash functions are used. For output of each hash function is uniformly distributed within [0, l−1] (i.e., hash functions are perfect). Given n, the number of elements in the buffer, the empty ratio φ, which should be defined as the ratio of bits with value 0 here, is $$\phi = \left(1 - \frac{k}{M_b}\right)^n \quad (7)$$

where k is the number of hash functions. Assuming $k \ll N_b$, as it is certainly the case, $\phi$ can be approximated as $$\phi \approx \exp\left(-\frac{kn}{M_b}\right) \quad (8)$$

A feature is falsely identified if and only if results of all k hash functions pointing to a bit with value 1. $p_n$ denotes the false positive probability when n elements are stored in the bit vector and can be easily calculated as $$p_n = (1-\phi)^k = \left[1 - \exp\left(-\frac{kn}{M_b}\right)\right]^k$$

By taking the average $$p = \frac{1}{N_m(\Gamma)+1} \sum_{n=0}^{N_m(\Gamma)} \left[1 - \exp\left(-\frac{kn}{M_b}\right)\right]^k \quad (9)$$

Equation (9) gives an implicit function for $M_b$, p, and k. We define $$M_b = MK(p,k) \quad (10)$$

Equation (10) shows the relationship between the space and design parameters p and k. To derive the expression for time, the probability of calculating x hash functions given features of n flows being stored in the buffer is $$Pr[T_b = x | N = n] = \begin{cases} \phi(1-\phi)^{x-1} & x < k \\ (1-\phi)^{k-1} & x = k \end{cases} \quad (11)$$

Averaging over x, the conditional expectation of $T_b$ is $$E[T_b | N=n] = \sum_{x=1}^{k-1} \phi(1-\phi)^{x-1} + (1-\phi)^{k-1} = \quad (12)$$

$$\sum_{x=1}^{k-1} \exp\left(-\frac{kn}{M_b}\right)\left[1 - \exp\left(-\frac{kn}{M_b}\right)\right]^{x-1} + \left[1 - \exp\left(-\frac{kn}{M_b}\right)\right]^{k-1}$$

By averaging over n at both sides of equation (12), we get the expectation of $T_b$ $$E[T_b] = \sum_{n=0}^{N_m(\Gamma)} Pr[N=n]E[T_b | N=n] = \frac{1}{N_m(\Gamma)+1} \sum_{n=0}^{N_m(\Gamma)} TK_n(p,k) \quad (13)$$

where $$TK_n(p,k) = \sum_{x=1}^{k-1} \exp\left(-\frac{kn}{MK(p,k)}\right)\left[1 - \exp\left(-\frac{kn}{MK(p,k)}\right)\right]^{x-1} + \left[1 - \exp\left(-\frac{kn}{MK(p,k)}\right)\right]^{k-1}$$

According to equation (13), the $E[T_b]$ is also a function of p and k.

Equations (10) and (13) represent the space/time trade-off for search operation of Bloom filter where k and p are the design parameters.

As for the insertion operation of Bloom filter. If the feature is in the buffer, all k hash functions still need to be calculated to make the decision. If the feature is not in the buffer, all k hash functions need to be calculated and set the k bits to 1. Therefore, $T_b$ is always k for insertion operation.

To analyze the space/time trade-off of BFA, results for that of Bloom filter can be applied here because BFA is originated from basic Bloom filter. However, there are some differences between these two algorithms. BFA has multiple buffers such as $SV_i$, $DV_i$, $C_i$, $i \in Z_w$. Therefore the space of BFA, denoted by $M_a$, is $w(2M_v + L)$, where w is the number of time slots, $M_v$ is the length of each source or destination vector, and L is the number of bits used to represent each counter. $T_a$ denotes the random variable representing the number of hash function calculations for BFA. Similar to equation (9), the average of false positive probability for the search operation on vector is $$p = \frac{1}{N_m(\tau)+1} \sum_{n=0}^{N_m(\tau)} \left[1 - \exp\left(-\frac{kn}{M_v}\right)\right]^k \quad (14)$$

The time slot of BFA is $\tau$, so that the upper limit of the summation operator is $N_m(\tau)$ rather than $N_m(\Gamma)$. Similarly, $M_v$ is a function of p and k. We define $$M_v = MK'(p,k) \quad (15)$$

Then $$M_a = w(2MK'(p,k) + L) \quad (16)$$

Once an hash function is calculated, its result can be used to address bits in all vectors. Therefore, the window size w has no effect on $E[T_a]$. Similar to equation 13, $$E[T_a] = \frac{1}{N_m(\tau)+1} \sum_{n=0}^{N_m(\tau)} TK'_n(p,k) \quad (17)$$

where $$TK'_n(p,k) = \sum_{x=1}^{k-1} \exp\left(-\frac{kn}{MK'(p,k)}\right)\left[1 - \exp\left(-\frac{kn}{MK'(p,k)}\right)\right]^{x-1} + \left[1 - \exp\left(-\frac{kn}{MK'(p,k)}\right)\right]^{k-1} \quad (18)$$

Equations (16) and (18) represent the space/time trade-off for search operation of BFA.

The insertion operation of BFA is the same as for the Bloom filter. In case of insertion, $T_a$ is always k. The removal operation is equivalent to a search operation followed by a decrement of 1 from the counter. Therefore, the time complexity of the removal operation is also the same as for the search operation.

In both the local module and the global module, certain detection algorithms must be used to detect DDoS attacks. At the end of each time slot $[t_i, t_{i+1})$, the statistics of at least one feature monitored $D_i$ are forwarded to the detection algorithm that will process them and evaluate the state of the feature, either normal or abnormal. For embodiments of the present invention that uses multiple features, the same steps are repeated for each feature with independent structures.

In practice, two simple algorithms are generally used: (1) threshold-based algorithm and (2) change-point algorithm. Both of them can use the feature data provided by the feature extraction modules to detect abnormalities. However, we note that an important issue has largely been ignored in the literature, that is, how to set the parameter of these algorithms. Moreover, existing schemes do not take into account the spatial correlation of attacks, which is nature to all DDoS attacks. It is illustrated in the following how the present invention determines the parameters of the above two algorithms introducing the concept of, how to improve performance of the traditional CUSUM algorithm introducing the DUAL CUSUM algorithm and uses a novel machine learning algorithm that can analyze the spatial correlation of feature data. The present invention uses the Receiver Operating Characteristic (ROC) method, which has never been used in the previous studies, to evaluate the performance of different detection algorithms as well as the efficiency of various features. In the usage of ROC, $N_f$ denotes the number of slots in which the detection algorithm declares an attack given that there are no attacks in these slots; $N_n$ denotes the number of slots in which there are no attacks; $N_d$ denotes the number of slots in which the detection algorithm declares an attack given that there are attacks in these slots; $N_a$ denotes the number of slots in which there are attacks. Based on the foregoing the false alarm probability is defined as $N_f/N_n$ and the detection probability is defined as $N_d/N_a$. In general, given the same feature data, false alarm probability and detection probability can be adjusted by varying the parameters of a detection algorithm. To evaluate the performance of different detection algorithms as well as the efficiency of various features, ROC curve is constructed by plotting false alarm probability against detection probability as the parameters or features of a detection algorithm are varied.

To utilize the threshold-based algorithm, a threshold for each feature is set up and an attack will be declared if a feature value exceeds the threshold in any time slot. As the threshold is varied, a ROC curve is produced since the threshold is the only parameter and a smaller threshold will lead to a smaller false alarm probability and large detection probability.

In the literature, a simple change-point algorithm, non parametric called Cumulative Summation (CUSUM) algorithm has been widely used because of its several attractive features. First, the CUSUM shows manageable computational complexity, and hence, can be implemented on-line for high-speed links. Second, the CUSUM is self-learning, which enables them to adapt to various network loads and usage patterns. However, existing works have not provided a comprehensive study on how to choose the parameter of CUSUM. Furthermore, these studies only consider the change from normal state to abnormal state, which means that the false alarm rate can be very high after the end of an attack. During this time, the CUSUM algorithm will trigger alarms although the state of the network changed from abnormal to normal. To conduct the discussion, we define the following notation:

$D_i$ denotes the observed feature at the end of time slot $[t_i, t_{i+1})$;

$\overline{D}^{(n)}$ denotes the expectation of $D_i$ in normal states;

$\overline{D}^{(a)}$ denotes the expectation of $D_i$ in abnormal states; Without losing generality we assume that $\overline{D}^{(n)} < \overline{D}^{(a)}$;

$Y_i$ denotes the adjustable variable, which is defined as $Y_i = D_i - \alpha$ where $\alpha$ is a constant parameter representing an upper bound on the historical estimate $\overline{D}^{(n)}$, i.e. $\overline{D}^{(n)} < \alpha < \overline{D}^{(a)}$. This ensures that $E[Y_i] < 0$ during the normal operation.

$S_i$ represents the state of the feature considered.

Now define the set of recursive equations that will be updated over time:

$$S_i = \max\{0, S_{i-1} + Y_i\} \ \forall i > 0$$

$$S_i = 0 \ i = 0$$

In the CUSUM algorithm, the state is normal if $S_i$ is smaller than a threshold H, otherwise the state is abnormal. From the discussion above, we note that there are two parameters need to be set, namely H and $\alpha$. However, we can see that these two parameters are correlated with each other. To overcome this problem, we shall use another parameter, i.e. the detection delay, denoted as R. According to the change-point theory, we have:

$$\frac{R}{H} \to \frac{1}{(\overline{D}_a - \overline{D}_n) - |\overline{D}_n - \alpha|} = \frac{1}{\overline{D}_a - \alpha}$$

From this equation we can derive $$H = R(\overline{D}_a - \alpha)$$

Consequently we can vary parameter R and $\alpha$ to get the performance of the CUSUM algorithm.

To reduce the false alarm problem of a single CUSUM algorithm (denoted as single-CUSUM), we develop a dual-CUSUM algorithm. In this algorithm, one CUSUM will be used in the normal state to detect the change from normal to abnormal state as soon as possible, while another CUSUM is responsible for detect the state change from abnormal to normal with a minimum delay. The setting of parameters for dual-CUSUM is similar to that of the single-CUSUM algorithm.

Figure 11:
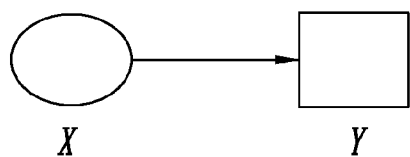
FIG. 11 is a schematic diagram showing the generative process in which the state of traffic generates the underlying stochastic process of traffic data.
Figure 12:
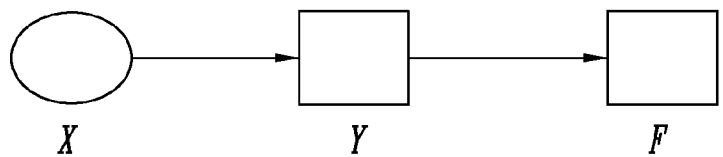
FIG. 12 is a schematic diagram showing the extended generative model including traffic feature vectors.
Figure 13:
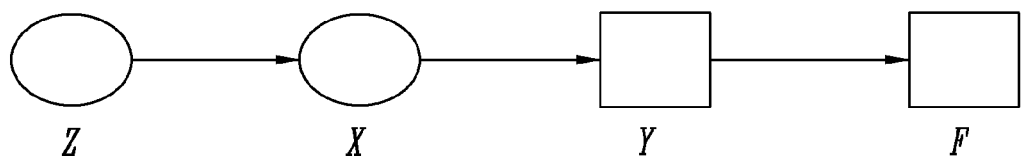
FIG. 13 is a schematic diagram showing the complete generative model including traffic data, traffic states, and correlation among traffic states.
Figure 14:
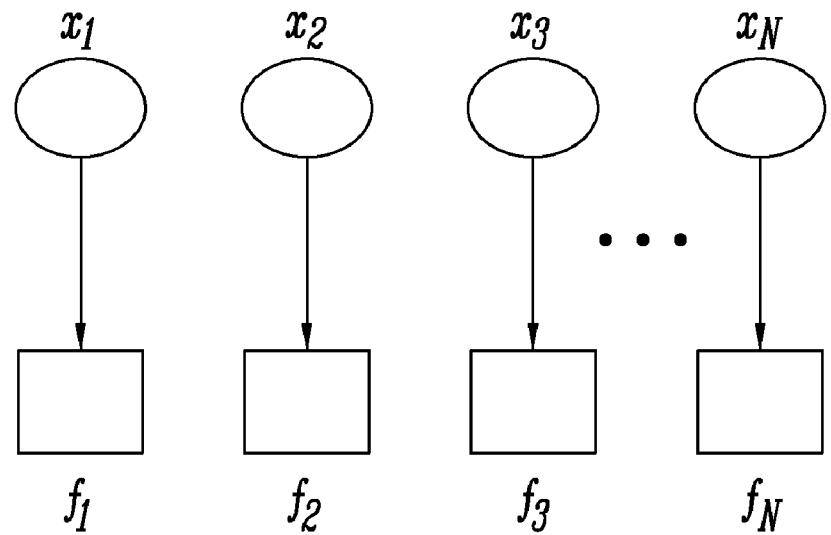
FIG. 14 is a schematic diagram showing the generative model that describes dependencies among traffic states and traffic feature vectors.
Figure 15:
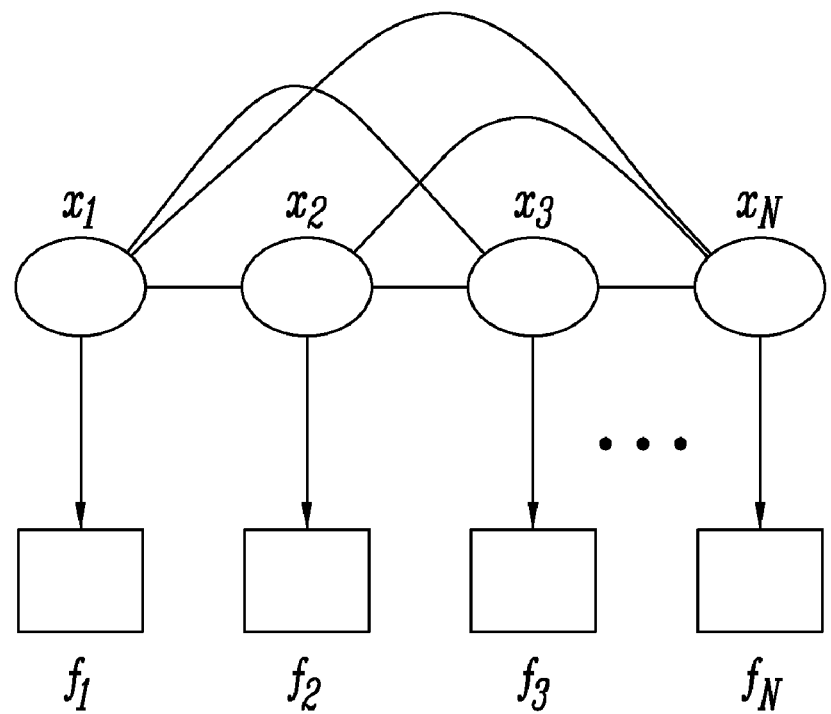
FIG. 15 is a schematic diagram showing complex generative model, where the Maximum A Posteriori (MAP) estimation is intractable.
Figure 16:
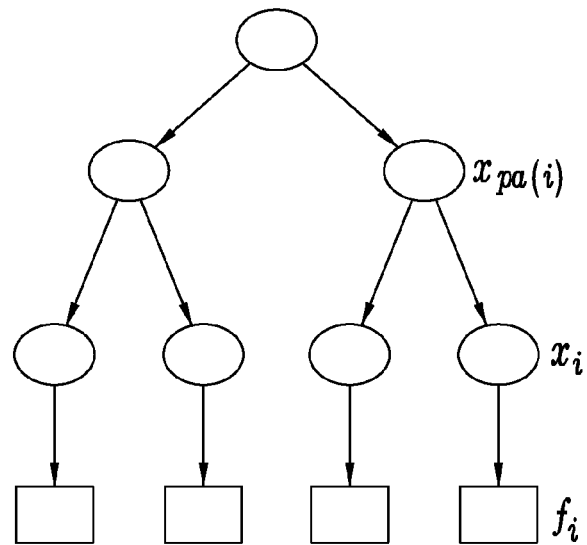
FIG. 16 is a schematic diagram showing the quad-tree model for one-dimensional data, where each parent has exactly two children; pa(i) denotes the parent of node i.

The present invention uses a powerful machine learning algorithm that can analyze the spatial correlation of DDoS traffic feature. The network states "under attack" or "no attack" generate statistically different traffic. For example, the traffic with the flooding type of attack differs in volume from the traffic in state "no attack". The network state is denoted as X, and traffic data as Y. Graphically, we represent this generating process as depicted in FIG. 11. In the present invention the network-related data (i.e., features) is represented as a matrix F of origin-destination pairs. An entry f in this matrix in the m-th row and n-th column represents a feature vector that characterizes network traffic from source m to destination n. Since features are extracted from traffic data Y, the above model is extended as illustrated in FIG. 12. It is a goal of the present invention to estimate X given Y and F, that is to estimate state $x_i$ of each source-destination traffic pair i, characterized by the i-th entry $f_i$ in the traffic matrix F. $x_i$ can be either 0 or 1. Since DDoS attacks are distributed, where numerous worms and zombies run similar (or even the same) programs at the same time, the traffic of several origin-destination pairs is characterized by the same statistical properties, or said to be correlated. Therein lies the novelty of the present invention, as the model in FIG. 11 is extended with yet another set of random variables, Z, that encode this correlation, as depicted in FIG. 13. In the present invention the introduction of Z leads to an improved estimation of X. Once F is extracted, F represents data Y such that only lower dimensional F needs to be operated over, and in this manner reduce computational load. In the present invention the network-state estimation is formulated as a machine-learning problem, where to each f it is assigned label x, which takes values in the predefined set of classes $x \in \{0,1\}$. The graphical representation of the outlined generative model is depicted in FIG. 14. In the graph, nodes represent random variables (vectors), and the connections represent statistical dependencies among random variables. Since feature vectors are measurable, they are called observable random vectors, and depicted as rectangular-shaped nodes. The states of observable vectors need to be estimated; therefore, are called hidden variables, and are depicted as round-shaped nodes. The model in FIG. 8 is in fact the simplest possible generative model, since there are no lateral interdependencies among nodes. Consequently, the joint probability of the model reads $P(F,X)=\Pi_i P(f_i|x_i)P(x_i)$. In the present invention, the network state estimation is conducted for each traffic $f_i$ independently, by using the Maximum A Posteriori (MAP) criterion given by $x^*_i = \arg\max P(f_i|x_i)P(x_i)$ where $x_i \in \{0,1\}$. To this end, it is necessary to learn likelihood $P(f_i|x_i)$ and prior $P(x_i)$ in the training process off-line. The present invention extracts yet another network feature—the correlation, $\xi_{mn}$, between given traffic m and n over a predefined time interval. Consequently, in addition to matrix F, we have the correlation matrix, $\Xi$, as network features. The reason for computing $\Xi$ stems from the goal to account for interdependencies among traffic pairs in the network. In the present invention this auxiliary information may lead to a more accurate estimation. However, if additional connections are introduced in the previous model, representing statistical dependencies among all the nodes, the model will be computationally intractable as shown in FIG. 15. Here, in order to perform MAP estimation, we would need to marginalize a very complex prior distribution over network states X as $x^*_i = \arg\max P(f_i|x_i) \Sigma_{j \neq i} \Sigma_{x_j} P(x_1, x_2, \ldots, x_i, \ldots x_N)$ where $x_i \in \{0,1\}$. Since the marginalization has to be done for every node, such a model for a large network would not be suitable. Therefore, the most challenging task in network-state estimation lies in choosing a suitable statistical model for specifying the joint probability distribution over hidden and observable random variables, since this choice conditions the MAP estimation. It is a goal of the present invention to preserve one-step connections, also known as Markovian dependencies, since they provide for a tractable MAP estimation. But, at the same time, the present invention accounts for dependencies among as many nodes as possible. To balance these two opposing goals, the present invention uses a multi-scale tree model, an example of which is depicted in FIG. 16. In this tree model the initial set of traffic states X is augmented with parents, grandparents and further up until the root node. That is, hidden variables are organized in levels, where nodes at the finest scale represent states of each source-destination traffic, while nodes at higher levels represent the state of a group of traffic-feature vectors. Hidden variables at higher levels can also take values in $\{0,1\}$. Connections are allowed only between nodes that belong to adjacent levels in the model. As such, the present invention does not account explicitly for all possible dependencies among traffic states, but implicitly through parent nodes. In this manner, the present invention preserves Markovian dependencies, while correlating all the nodes.

Figure 17:
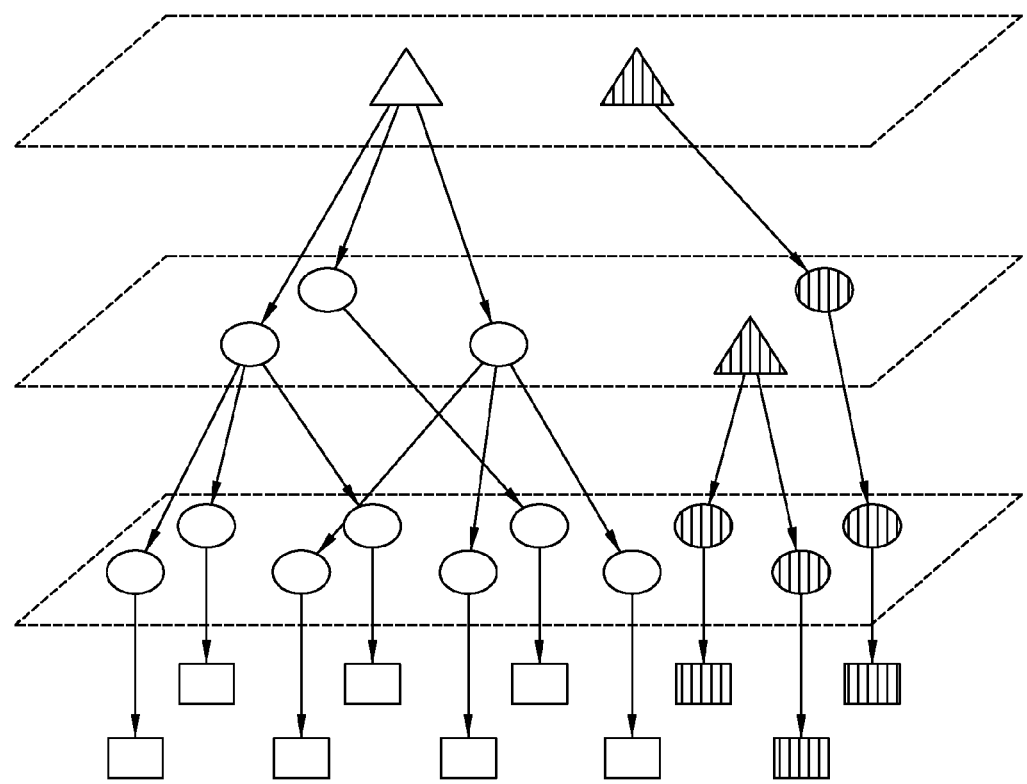
FIG. 17 is a schematic diagram showing the irregular tree consisting of a forest of sub-trees, each marked by distinct shading; round- and square-shaped nodes indicate hidden and observable variables, respectively; triangles indicate roots.

The next question is how to determine which parent-child pairs should be connected. One possibility is to choose the fixed-structure tree, where, for example, each parent has exactly four children. This model is the well-known Hidden Markov Tree (a.k.a. quad-tree) used for image modeling. However, it has been reported that due to the fixed structure, quad-trees yield "blocky" estimates. Therefore, the present invention uses irregular-structure tree (or short irregular tree), where connections between parent and children nodes are not fixed, but rather estimated on a given data. The novelty of the present invention added to multi-scale statistical modeling is that it introduces connectivity variables, $z_{ij}$, which regulate if there is a connection between child i and parent j. The connectivity variables, Z, are hidden, and need to be estimated, based on the correlation matrix $\Xi$. FIG. 13 illustrates the dependencies between sets of variables F, X, and Z in the extended multi-scale model in the present invention. From FIG. 13 the joint probability of the irregular tree is given by $P(F,X,Z,\Xi)=P(F|X)P(X|Z)P(Z|\Xi)P(\Xi)$. The irregular tree defines the distribution over connections between nodes, and the distribution over node classes (i.e., traffic states). Thus, for a given network data, these two distributions need to be estimate simultaneously. The problem of estimating the optimal model's topology and its distributions is known to be NP-hard. The present invention solves this problem by using the Expectation-Maximization (EM) algorithm, which is a stage-wise optimization algorithm, guaranteed to increase the likelihood of the model in each iteration step. Because of the Markovian connections through scales, irregular trees are characterized by very fast inference algorithms, which makes them attractive tools for applications with stringent real-time constraints. The inference of model structure and distributions from the given data produces a hierarchical model depicted in FIG. 17. In this figure, the model structure adapts to encode underlying statistical processes in the data. It consists of a forest of sub-trees, since there is no constraint that there be only one root as in quad-trees.

For the Bayesian approach in the present invention, it is necessary to learn the parameters of the model through training. To this end, it is necessary to prepare representative examples of the network data containing "under attack" and "no attack" states. Once the parameters of the irregular tree are learned, the state of a given unseen traffic is estimate by computing the posterior distribution of each node state. The probabilistic approach of the present invention allows to easily obtain the ROC curve to test false alarm and detection rate in a principled manner.

The irregular-tree model for estimating the traffic states given network data is explained as follows. In order to fully characterize the irregular tree (and any graphical model, for that matter), it is necessary to learn both the graph topology (structure) and the parameters of transition probabilities between connected nodes from training data. Usually, for this purpose, one maximizes the likelihood of the model over training data, while at the same time minimizing the complexity of model structure. Prior art methods are successful at learning both the structure and parameters from complete data. Unfortunately, when the data is incomplete (i.e., some random variables are hidden), optimizing both the structure and parameters becomes NP-hard. The present invention is a solution to the NP-hard problem of model-structure estimation. The present invention uses a variant of the Expectation- Maximization (EM) algorithm, to facilitate efficient search over large number of candidate structures. In particular, the EM procedure iteratively improves its current choice of parameters by using the following two steps. In Expectation step, current parameters are used for computing the expected value of all the statistics needed to evaluate the current structure. That is, the missing data (hidden variables) are completed by their mean values. In Maximization step, current parameters are replaced with those that maximize the likelihood over the complete data. This second step is essentially equivalent to learning model structure and parameters from complete data, and, hence, can be done efficiently by using the Belief Propagation algorithm.

An irregular tree is a directed acyclic graph with V nodes, organized in hierarchical levels, $V^k$, $k=\{0, 1, \ldots, K\}$, where $V^0$ denotes the leaf level. The layout of nodes is identical to that of the quad-tree, such that the number of nodes at level k can be computed as $V^k=|V^{k-1}|/2=\ldots=|V^0|/2^k$. Connections are established under the constraint that a node at level k can become a root or it can connect only to the nodes at the next k+1 level. The network connectivity is represented by a random matrix, Z, where entry $z_{ij}$ is an indicator random variable, such that $z_{ij}=1$ if $i \in V^k$, $j \in V^{k+1}$ are connected. Z contains an additional zero ("root") column, where entries $z_{i0}=1$ if i is a root node.

Each node i is characterized by an image-class random variable, $x_i$, which can take values in a finite class set C. In our case, $C=\{0,1\}$. For the given Z, the label $x_i$ of node i is conditioned on $x_j$ of its parent j, and is given by conditional probability tables $P(x_i|x_j, z_{ij}=1)$. For roots i, we have $P(x_i|x_0, z_{i0}=1)$ equal by definition to $P(x_i)$. The joint probability of all image-class variables $X=\{x_i\}$, for all $i \in V$, is given by $$P(X|Z) = \prod_{k=0}^{K} \prod_{i \in V^k} P(x_i | x_i, z_{ij} = 1)$$

Next, leaf nodes are characterized by observable random variables $F=\{f_i\}$, $\forall i \in V^0$. In the present invention observables $f_i$ are conditionally independent given the corresponding $x_i$:

$$P(F|X) = \prod_{i \in V^0} P(f_i | x_i)$$

$$P(f_i | x_i = c) = \sum_{g=1}^{G} \pi_c(g) N(f_i; \mu_c(g), \Sigma_c(g))$$

where $P(f_i|x_i=c)$, $c \in C$, is modeled as a mixture of Gaussians. The Gaussian-mixture parameters can be grouped in $\Theta=\{\pi_c(g), \mu_c(g), \Sigma_c(g), G_c\}$, for all $c \in C$.

Finally, the connectivity distribution is specified as $$PP(Z|\Xi) = \prod_{i,j \in V} P(z_{ij} = 1 | \xi_{ij}) = \prod_{i,j \in V} N(\xi_{ij}; m, \theta)$$

where $\xi_{ij}$ is the observable correlation between child i and parent j, and m and $\Theta$ are the mean and variance of $z_{ij}$. Note that a higher-level node represents network data at the corresponding coarse scale. Therefore, $\xi_{ij}$ is suitably extracted as a network feature to represent correlation between groups of traffic. For example, $\xi_{ij}$ may represent the average correlation of traffic i with the traffic of four neighboring nodes whose parent is j. Other strategies are also possible.

The irregular tree is fully characterized by the joint prior $P(F,X,Z|\Xi)=P(F|X)P(X|Z)P(Z|\Xi)$. The introduced parameters of the model can be grouped in the parameter set $\Omega$. The method used by the present invention to infer the "best" configuration of Z and X from the observed image data F and $\Xi$ is as follows. The standard Bayesian formulation of the inference problem consists in minimizing the expectation of some cost function R, given the data $$(\hat{Z},\hat{X})=\arg \min_{Z,X} E\{R((Z,X),(Z',X'))|F,\Xi,\Omega\},$$

where R penalizes the discrepancy between the estimated configuration (Z,X) and the true one (Z',X'). The present invention uses the following cost function:

$$R((Z, X), (Z', X')) = R(X, X') + R(Z, Z') = \sum_{k=0}^{K} \sum_{i \in V^k} [1 - \delta(x_i - x'_i)] + \sum_{k=0}^{K} \sum_{(i,j) \in V^k \times \{0, V^{k+1}\}} [1 - \delta(z_{ij} - z'_{ij})]$$

where ' stands for true values, and $\delta(\bullet)$ is the Kronecker delta function. From this equation, the resulting Bayesian estimator of X is shown as equation A:

$$\forall i \in V, \hat{x}_i = \arg \max_{x_i \in C} P(x_i | Z, F, \Xi).$$

Next, given the constraints on connections in the irregular tree, minimizing $E\{R((Z,X),(Z',X'))|F, \Xi, \Omega\}$ is equivalent to finding a set of optimal parents ĵ such that (for all k) (for all $i \in V^k$) $(z_i \neq 0)$ ĵ=arg $\max_{j \in \{0, V^{k+1}\}} P(z_{ij}=1|\xi_{ij})$ where $z_i$ is equal to $$\sum_{k \in V^{k-1}} z_{ki}$$

$z_{ki}$, and $z_i \neq 0$ represents the event "node i has children", that is, "node i is included in the irregular-tree structure." The global solution to this equation is an open problem in many research areas. The present invention uses a stage-wise optimization, where, moving up starting from the leaf level $k=\{0, 1, \ldots, K\}$, tree structure includes optimal parents at $V^{\wedge}(k+1)$ according to equation B: (for all $i \in V^k (\hat{z}_i \neq 0)$) arg $\max_{j \in \{0, V^{k+1}\}} P(z_{ij}=1 \xi_{ij})$, where $\hat{z}_i \neq 0$ denotes an estimate that i has already been included in the tree structure when optimizing the previous level $V^{\wedge}k$.

Based on equation A and equation B, the present invention solves for $(\hat{Z},\hat{X})$ in a recursive procedure until some convergence criterion is met. Thus, in a recursive step t, the present invention derives estimate X(t) using equation A based on the known estimate Z(t-1) of the previous step t-1; then substitutes X(t) in equation B to derive estimate Z(t). The algorithm is converged if P(F,X|Z) does not vary more than some threshold $\epsilon$ for N consecutive iteration steps t, where $\epsilon$ and N are subject to specific application requirements. Although, the optimization given by equation A and equation B requires simultaneous optimization of $\hat{X}$ and $\hat{Z}$, note that the present invention infers the irregular tree stage-wise and the algorithm recovers from stationary points for sufficiently large N without yielding sub-optimal solutions. The overall inference algorithm is summarized in FIG. 18.

Steps 2 and 7 in the algorithm can be interpreted as inference of $\hat{X}$ given F for a fixed-structure tree. In particular, for step 2, where the initial structure is the quad-tree, we can use the standard inference on quad-trees, where, essentially, belief messages are propagated in only two sweeps up and down the tree. For step 7, the irregular tree represents a forest of sub-trees, which also have fixed, though irregular, structure; therefore, the very same tree-inference algorithm can be used for each of the sub-trees. This algorithm is called Belief Propagation, which is illustrated in FIG. 18. The notation is simplified as $P(x_i|Z,F,\Xi) \rightarrow P(x_i|F)$ and $P(x_i|x_j,Z) \rightarrow P(x_i|x_j)$. Also, c(i) denotes children of i, and d(i) denotes the set of all the descendants down the tree of node I including i itself. Thus, $F_{d(i)}$ denotes a set of all observables down the sub-tree whose root is i. Also, for computing $P(x_i|F_d(i))$ in the bottom-up pass, a means that equality holds up to a multiplicative constant that does not depend on $x_i$.

Figure 19:
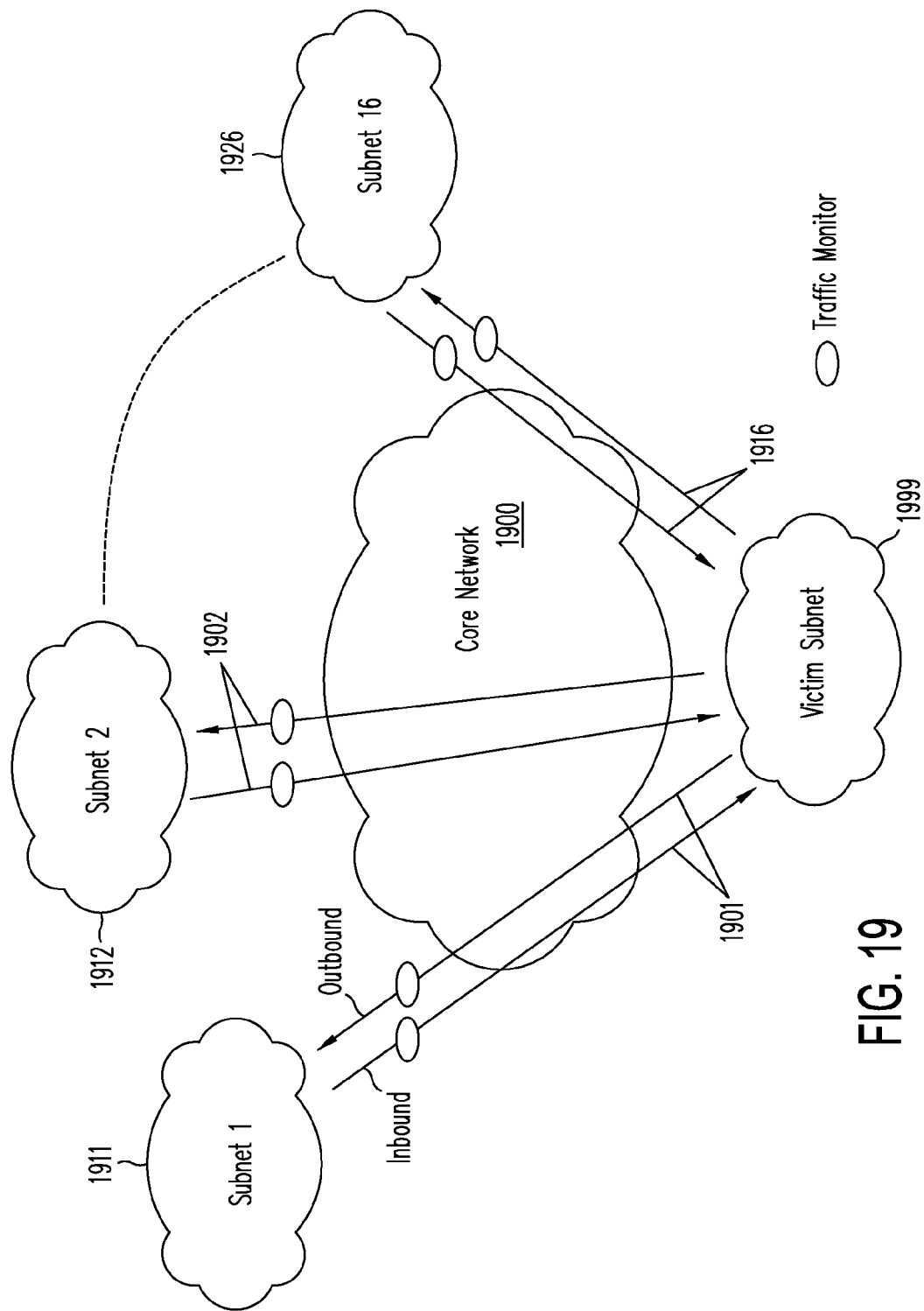
FIG. 19 is a schematic diagram of an experiment ISP network for a simulation example of four embodiments of the present invention being evaluated through the SYN flood attack with spoofed source address.

Four embodiments of the present invention are evaluated through a simulation example of the SYN flood attack with spoofed source address. In this simulation, the ISP network consists of a core network 1900, a victim network 1999, and 16 subnets 1911-1926, as illustrated in FIG. 19. Virtual connections 1901-1916 are between subnet 1911-1926 and the victim network 1999; the inbound of virtual connections 1901-1916 denotes the direction from subnet 1911-1926 to the victim network 1999; and the outbound of subnet 1911-1926 denotes the direction from the victim network 1999 to subnet 1911-1926. For the background traffic, we use the trace data provided by Auckland University "Auckland-IV trace data," 2001 [online]. available http://wand.cs.waikato.ac.nz/wand/wits/auck/4/ This data set consists of packet header information of traffic between the Internet and Auckland University. The connection is OC-3 (155 Mb/s) for both directions. In this simulation, the traffic of a single day is used as the traffic between a specific subnet and the victim subnet, where the inbound traffic is the traffic from the Internet to Auckland University and the outbound traffic is the traffic from the Auckland University to the Internet. 16 days of trace are used to represent 16 different links. To simulate the low volume distributed SYN flood attacks, SYN packets are randomly added with spoofed source IP addresses into the background. The average SYN attack packet rate is 1% of the total packet rate at the same period. For DDoS attacks, the duration of attacks on several links (not necessarily all links) are synchronized. The 2D feature of the unmatched SYN packets in one time slot is used to detect distributed SYN flood attacks. The number of SYN packets and the number of unmatched SYN packets toward the victim subnet are reported and used in the analysis. The setting of feature extraction module in this simulation is as follows:

$T_s=10$ sec, $R_f=9$, $R_b=0$, $N_{ht}=2^{14}=16$ k, $L_{bf}=16$.

Since the length of key for the unmatched SYN is $L_k=20$ bytes, the memory requirement for each monitor is $N_{ht}*L_k=320$ KB In the local module, the memory requirement is calculated as $(R_b+R_f+1)*2^{(L_{bf}-3)}+(R_f+1)*N_{ht}*L_k=3.28$ MB.

$R_f$ is chosen to be 9, the minimum detection delay is bounded by $(R_f+1)*T_s=100$ sec.

Figure 20B:
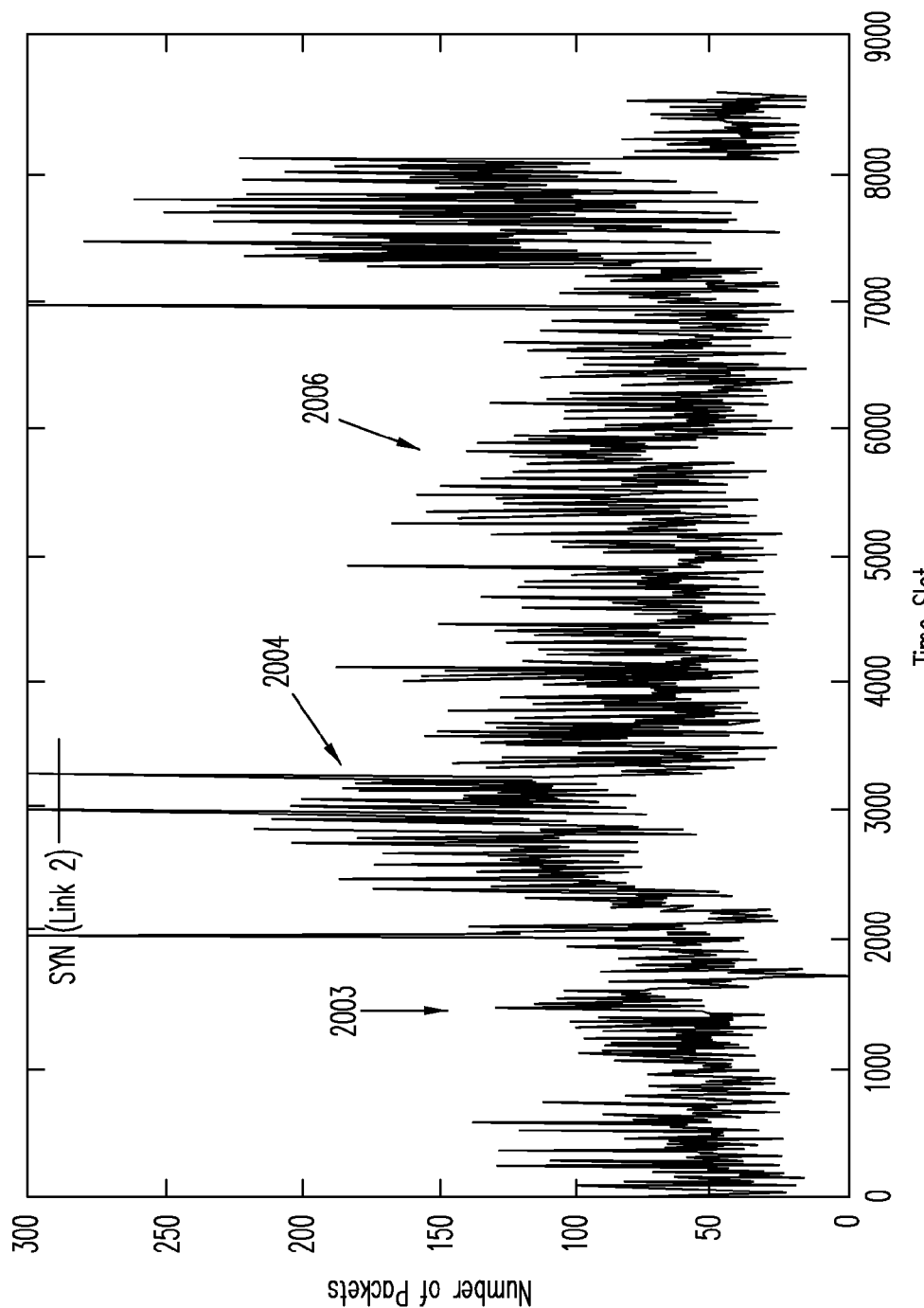
FIG. 20b shows number of unmatched SYN packets of link1.
Figure 20C:
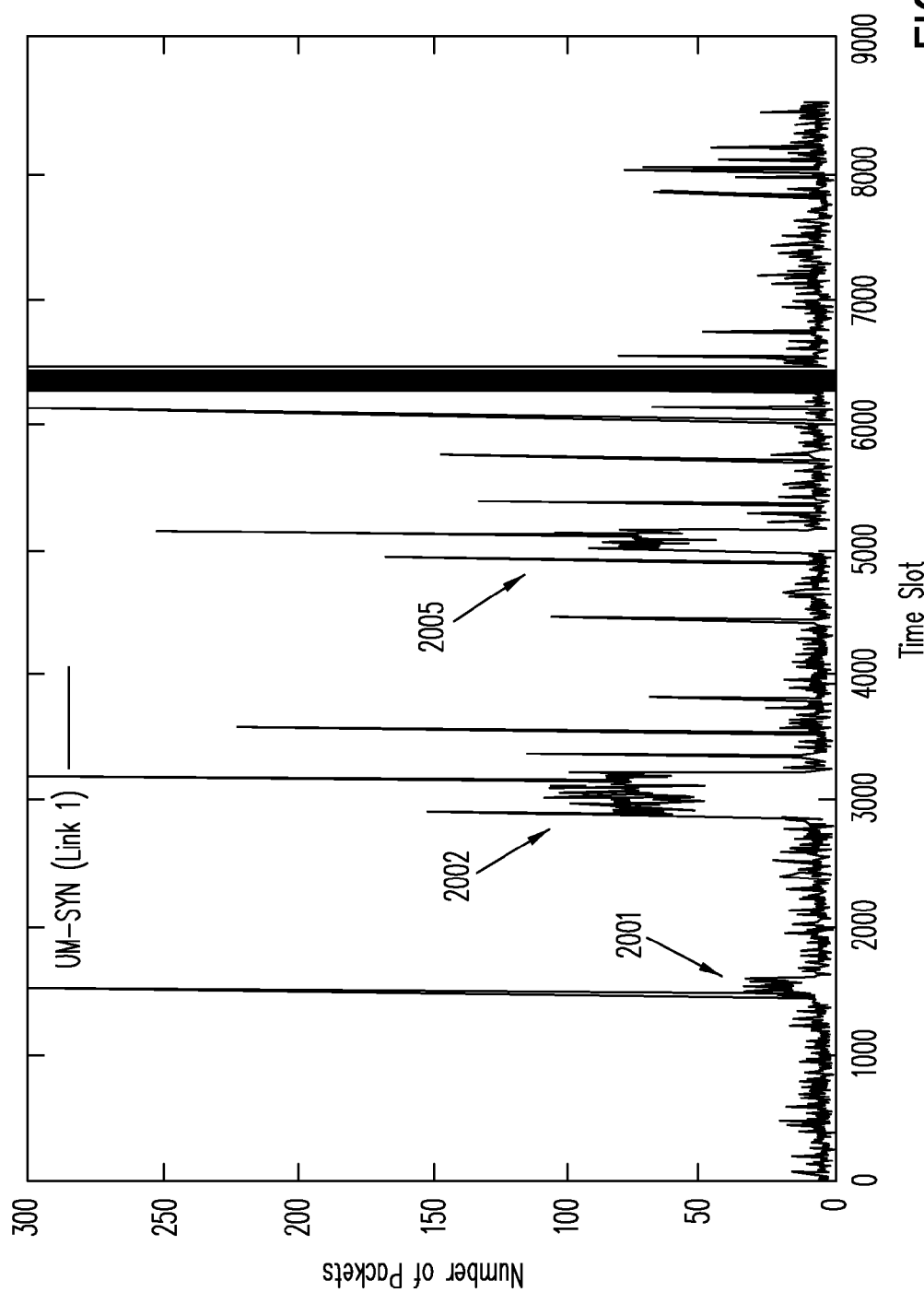
FIG. 20c shows number of SYN packets of link 2.

FIG. 20 shows the feature data from two links. For these two links, synchronized attacks are added during 1400-1600 and 2800-3200 slots in FIG. 20a and FIG. 20c. In addition, asynchronous attacks are also added in 5000-5200 slots in FIG. 20a and 5700-900 slots in FIG. 20c, for link 1 and link 2, respectively.

Figure 20D:
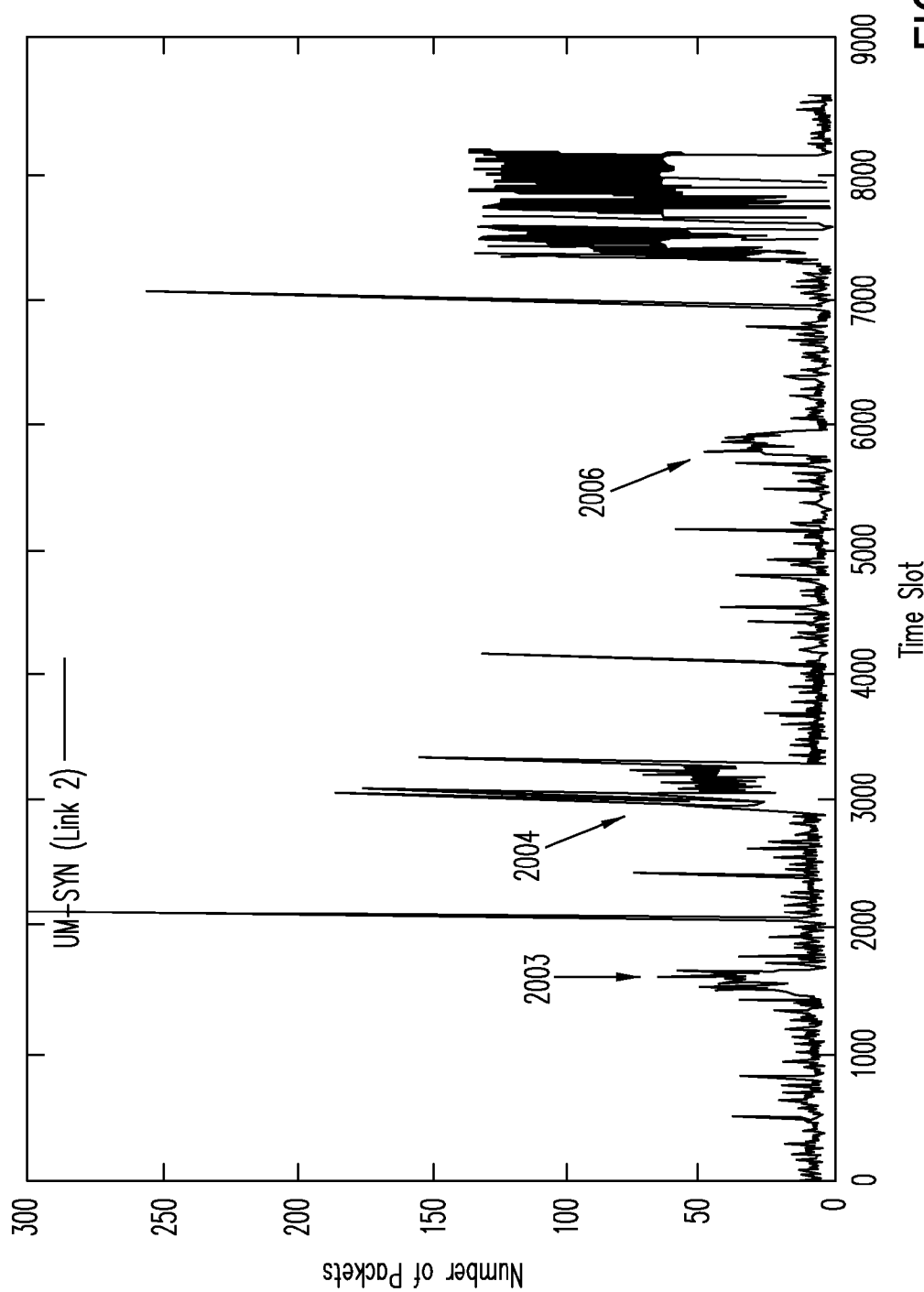
FIG. 20 shows feature data from 2 links of a simulation where
FIG. 20a shows number of SYN packets of link 1.

From FIG. 20 the feature data are rather noisy, especially for the number of SYN packets. From FIG. 20a and FIG. 20c the low volume attacks can hardly be distinguished from background traffic when the number of SYN packets is used as feature data. On the other hand, the attack traffic can be much easily found when the number of unmatched SYN packets is as the feature data as illustrated in FIG. 20b and FIG. 20d.

FIG. 21 compares the ROC of threshold-based and machine learning algorithms with two different features: the number of SYN packets and the number of unmatched SYN packets. FIG. 21 illustrates that, with the same detection algorithm, using the number of unmatched SYN packets can significantly improve the ROC curves 2130 and 2140 compared to 2110 and 2120. In other words, given the same false alarm probability, the detection probability is much higher when the unmatched SYN is used as feature. Another important result from FIG. 21 is that the machine learning algorithm can significantly improve the ROC curves 2120 compared to 2110 and 2140 compared to 2130 given the same feature data.

Figure 22:
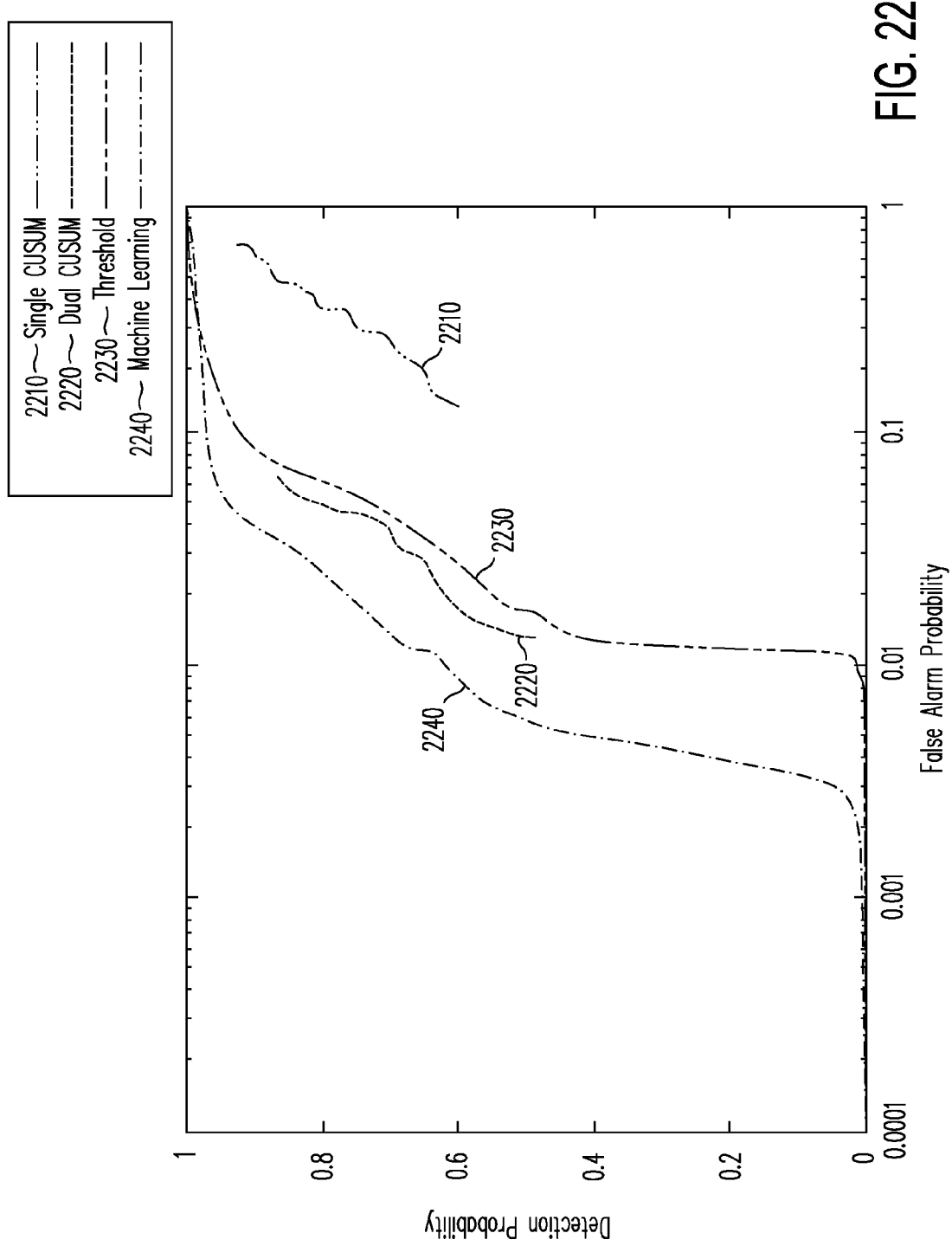
FIG. 22 is a set of ROC curves comparing the performance of four detection algorithms.

In FIG. 22 the performance of four detection algorithms are compared using the same feature of the number of unmatched SYN packets. For the single CUSUM and the dual-CUSUM algorithm, the detection delay D is chosen from 1 to 10 and the adjust parameter can be chosen from $\alpha_i = (A_{attack} - A_{normal})*i/17$, for all $1<=i<=16$, where $A_{attack}$ and $A_{normal}$ are the average number of unmatched SYN packets in attack and normal conditions, respectively. The results in FIG. 22 show that, the performance of the machine learning algorithm is the best amongst all algorithms as shown by ROC curve 2240. The dual-CUSUM 2220 out-performs the simple threshold-based algorithm 2230 with appropriate setting of parameters.

Figure 23:
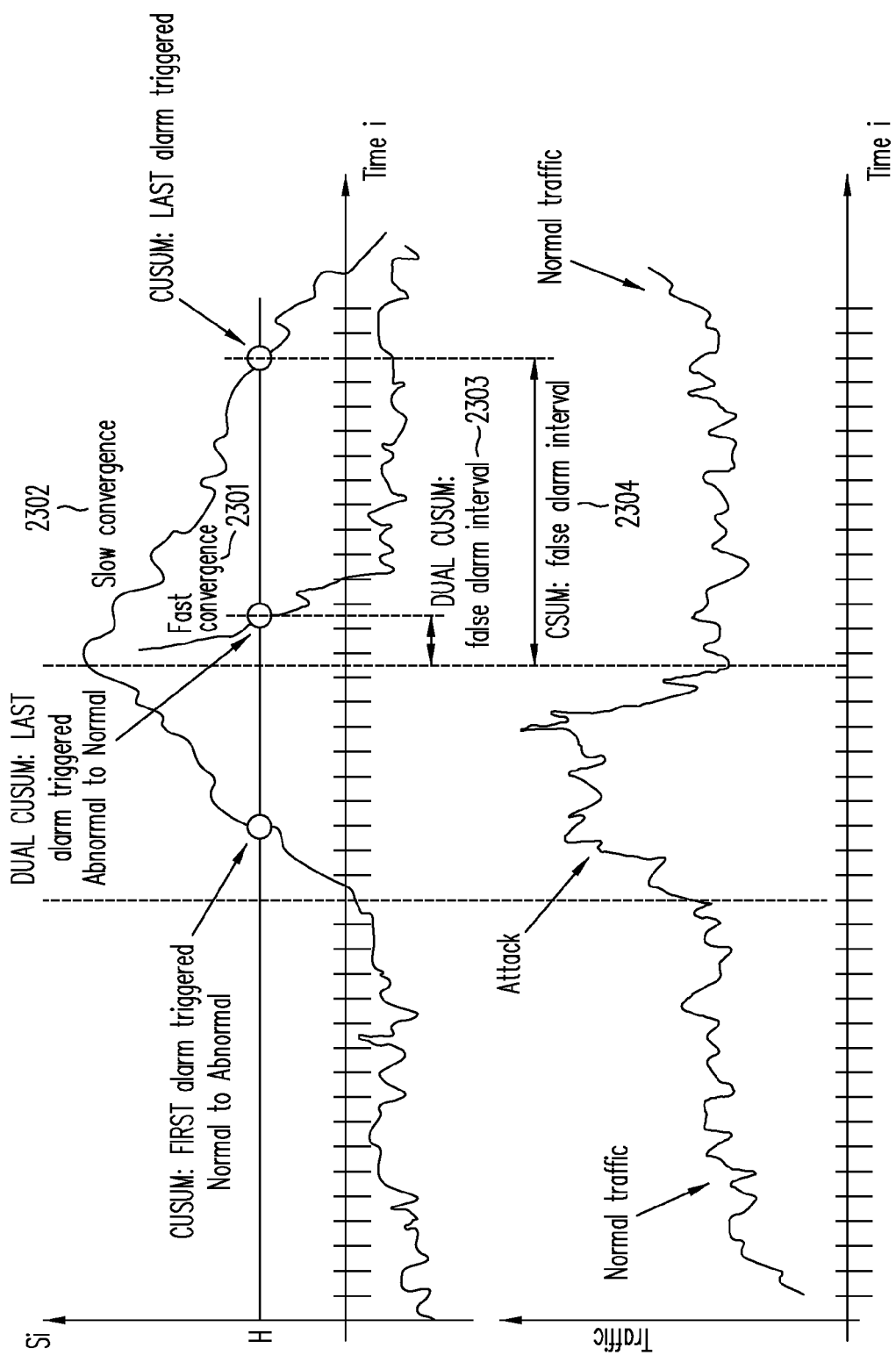
FIG. 23 illustrates the operation of the dual CUSUM algorithm.

FIG. 23 illustrates the operation of the dual CUSUM algorithm. The fast convergence 2301 of the dual CUSUM algorithm produces shorter false alarm interval 2303 while the slow convergence 2302 of the single CUSUM algorithm produces linger false alarm interval 2303.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that connections or networks may be wired, wireless, or a combination of wired and wireless. Other variations and embodiments are possible in light of above teachings, and it is thus intended that the scope of invention not be limited by this Detailed Description, but rather by Claims following.

I claim:

1. A method for detecting a denial of service attack to a networked device comprising:
   using each of a plurality of traffic monitors, monitoring a corresponding plurality of network data instances flowing across a corresponding data connection to generate a corresponding plurality of inbound and outbound keys each extracted from a unidirectional portion of the corresponding plurality of network data instances;
   using each of a plurality of local analyzers corresponding to a local portion of the plurality of traffic monitors, deriving at least one 2D matching feature, wherein the 2D matching feature comprises one of a matched inbound/outbound key pair and an unmatched inbound/outbound key pair associated with the corresponding data connection;

using at least one global analyzer, matching a first unmatched inbound/outbound key pair derived by a first local analyzer to a second unmatched inbound/outbound key pair derived by a second local analyzer to adjust the at least one 2D matching feature to generate an adjusted 2D matching feature when the at least one 2D matching feature comprises the unmatched inbound/outbound key pair; and detecting a denial of service attack based on one of the at least one 2D matching feature and the adjusted 2D matching feature.

2. The method of claim 1 wherein each 2D matching feature is associated with at least one selected from the list consisting of:

Matching Source IP of inbound packet to Destination IP of outbound traffic,

Matching SYN of inbound packet to SYN/ACK of outbound packet,

Matching SYN (HTTP) of inbound packet to SYN/ACK of outbound packet,

Matching SYN (SSH) of inbound packet to SYN/ACK of outbound packet,

Matching SYN/URG of inbound packet to SYN/ACK of outbound packet,

Matching SYN/URG (HTTP) of inbound packet to SYN/ACK of outbound packet,

Matching SYN/URG (SSH) of inbound packet to SYN/ACK of outbound packet,

Matching SYN/ACK of inbound packet to ACK of outbound packet,

Matching SYN/ACK of inbound packet to SYN of outbound packet,

Matching FIN of inbound packet to FIN of outbound packet,

Matching FIN(HTTP) of inbound packet to FIN of outbound packet,

Matching FIN(SSH) of inbound packet to FIN of outbound packet,

Matching ICMP of inbound packet to ICMP of outbound packet,

Matching UDP of inbound packet to UDP of outbound packet,

Matching UDP (DNS) of inbound packet to UDP of outbound packet,

Matching UDP (SNMP) of inbound packet to UDP of outbound packet.

3. The method of claim 2 further comprising correlating a first Bloom filter representing the first unmatched inbound/outbound key pair and a second Bloom filter representing the second unmatched inbound/outbound key pair for matching the first and second unmatched inbound/outbound key pairs.

4. The method of claim 3 wherein correlating the first and second Bloom filters is by comparing a portion of the first Bloom filter representing an inbound portion of the first unmatched inbound/outbound key pair to a portion of the second Bloom filter representing an outbound portion of the second unmatched inbound/outbound key pair.

5. The method of claim 4, wherein the first and second Bloom filters is comprised in a Bloom filter array used by the at least one global analyzer, wherein the Bloom filter array uses at least one hash function, and wherein k keys are randomly generated and changed periodically.

6. The method of claim 1 wherein the detecting step further comprises using a dual CUSUM algorithm.

7. The method of claim 1 wherein the detecting step is based on a multiscale tree model comprising:

a plurality of fine scale nodes of the multiscale tree, each representing a state of a source-destination traffic of at least the corresponding plurality of network data instances, wherein the state of the source-destination traffic comprises one of under attack and no attack;

a plurality of higher level nodes of the multiscale tree, each representing a state of a group of traffic-feature vectors; and a plurality of connectivity variables of the multiscale tree, each representing a probability of a connection among the plurality of fine scale nodes and the plurality of the higher level nodes, wherein connections are allowed only between adjacent levels in the multiscale tree, wherein a topology of the plurality of fine scale nodes and the plurality of the higher level nodes as well as the plurality of connectivity variables are determined based on a machine learning algorithm.

8. The method of claim 7, wherein the plurality of fine scale nodes and the plurality of the higher level nodes are comprised in an irregular tree of the multiscale tree model, wherein the machine learning algorithm further comprises an Estimation-Maximization algorithm.

9. An apparatus for detecting a distributed denial of service attack to a networked device comprising:

a plurality of traffic monitors each for monitoring a corresponding plurality of network data instances flowing across a corresponding data connection to generate a corresponding plurality of inbound and outbound keys each extracted from a unidirectional portion of the corresponding plurality of network data instances;

a plurality of local analyzers each corresponding to a local portion of the plurality of traffic monitors for deriving at least one 2D matching feature, wherein the 2D matching feature comprises one of a matched inbound/outbound key pair and an unmatched inbound/outbound key pair associated with the corresponding data connection; and at least one global analyzer for matching a first unmatched inbound/outbound key pair derived by a first local analyzer to a second unmatched inbound/outbound key pair derived by a second local analyzer to adjust the at least one 2D matching feature to generate an adjusted 2D matching feature when the at least one 2D matching feature comprises the unmatched inbound/outbound key pair, wherein a denial of service attack is detected by one of the plurality of local analyzers and the at least one global analyzer based on one of the at least one 2D matching feature and the adjusted 2D matching feature.

10. The apparatus of claim 9 wherein each 2D matching feature is associated with at least one selected from the list consisting of:

Matching Source IP of inbound packet to Destination IP of outbound traffic,

Matching SYN of inbound packet to SYN/ACK of outbound packet,

Matching SYN (HTTP) of inbound packet to SYN/ACK of outbound packet,

Matching SYN (SSH) of inbound packet to SYN/ACK of outbound packet,

Matching SYN/URG of inbound packet to SYN/ACK of outbound packet,

Matching SYN/URG (HTTP) of inbound packet to SYN/ACK of outbound packet,

Matching SYN/URG (SSH) of inbound packet to SYN/ACK of outbound packet,

Matching SYN/ACK of inbound packet to ACK of outbound packet,

Matching SYN/ACK of inbound packet to SYN of outbound packet,

Matching FIN of inbound packet to FIN of outbound packet,

Matching FIN (HTTP) of inbound packet to FIN of outbound packet,

Matching FIN (SSH) of inbound packet to FIN of outbound packet,

Matching ICMP of inbound packet to ICMP of outbound packet,

Matching UDP of inbound packet to UDP of outbound packet,

Matching UDP (DNS) of inbound packet to UDP of outbound packet,

Matching UDP (SNMP) of inbound packet to UDP of outbound packet.

11. The apparatus of claim 9 wherein the at least one global analyzer correlates a first Bloom filter representing the first unmatched inbound/outbound key pair and a second Bloom filter representing the second unmatched inbound/outbound key pair for matching the first and second unmatched inbound/outbound key pairs.

12. The apparatus of claim 11 wherein the at least one global analyzer correlates the first and second Bloom filters by comparing a portion of the first Bloom filter representing an inbound portion of the first unmatched inbound/outbound key pair to a portion of the second Bloom filter representing an outbound portion of the second unmatched inbound/outbound key pair.

13. The apparatus of claim 12,
wherein the first and second Bloom filters is comprised in a Bloom filter array used by the at least one global analyzer,
wherein the Bloom filter array uses at least one hash function, and
wherein k keys are randomly generated and changed periodically.

14. The apparatus of claim 9 wherein at least one detecting device uses a dual CUSUM algorithm.

15. The apparatus of claim 9 wherein the at least one global analyzer detects the denial of service attack based on a multiscale tree model comprising:
a plurality of fine scale nodes of the multiscale tree, each representing a state of a source-destination traffic of at least the corresponding plurality of network data instances, wherein the state of the source-destination traffic comprises one of under attack and no attack;
a plurality of higher level nodes of the multiscale tree, each representing a state of a group of traffic-feature vectors; and
a plurality of connectivity variables of the multiscale tree, each representing a probability of a connection among the plurality of fine scale nodes and the plurality of the higher level nodes, wherein connections are allowed only between adjacent levels in the multiscale tree,
wherein a topology of the plurality of fine scale nodes and the plurality of the higher level nodes as well as the plurality of connectivity variables are determined based on a machine learning algorithm.

16. The apparatus of claim 15,
wherein the plurality of fine scale nodes and the plurality of the higher level nodes are comprised in an irregular tree of the multiscale tree model,
wherein the machine learning algorithm comprises an Estimation-Maximization algorithm.

\* \* \* \* \*